United States Patent
von der Embse

(10) Patent No.: US 7,391,819 B1
(45) Date of Patent: Jun. 24, 2008

(54) CAPACITY BOUND AND MODULATION FOR COMMUNICATIONS

(75) Inventor: Urbain Alfred von der Embse, P.O. Box 11690, Marina del Rey, CA (US) 90295

(73) Assignee: Urbain Alfred von der Embse, Westchester, CA (US)

( * ) Notice: Subject to any disclaimer, the term of this patent is extended or adjusted under 35 U.S.C. 154(b) by 870 days.

(21) Appl. No.: 10/266,256

(22) Filed: Oct. 8, 2002

(51) Int. Cl.
   *H04L 27/00* (2006.01)
(52) U.S. Cl. .......... 375/295; 375/261; 375/298
(58) Field of Classification Search ........ 375/130, 375/261, 295, 298
See application file for complete search history.

(56) References Cited

U.S. PATENT DOCUMENTS

| | | | | |
|---|---|---|---|---|
| 5,646,935 A * | 7/1997 | Ishikawa et al. | ............ | 370/207 |
| 6,856,652 B2 * | 2/2005 | West et al. | ............ | 375/260 |
| 7,010,048 B1 * | 3/2006 | Shattil | ............ | 375/259 |
| 2002/0031189 A1 * | 3/2002 | Hiben et al. | ............ | 375/260 |
| 2002/0101936 A1 * | 8/2002 | Wright et al. | ............ | 375/296 |
| 2002/0176486 A1 * | 11/2002 | Okubo et al. | ............ | 375/146 |
| 2004/0116078 A1 * | 6/2004 | Rooyen et al. | ............ | 455/101 |

* cited by examiner

*Primary Examiner*—Curtis B Odom

(57) ABSTRACT

A new bound on communications capacity, a modulation QLM to derive this bound, and QLM to support communications with performance close to this bound. The QLM modulation and demodulation algorithms offer a method for communications links to support a substantially higher data rate than allowed by the Shannon bound for wired, wireless, optical, and the plurality of communications links. The invention compares QLM modulation performance with phase-shift-keying PSK and quadrature amplitude modulation QAM, describes how it can be used with PSK and QAM, and with gaussian minimum shift keying GMSK, orthogonal frequency division multiple access OFDMA, code division multiple access CDMA, and compares QLM modulation performance with the Shannon bound and the new bound derived in this invention. Additional applications for QLM signal processing and bound include the plurality of information theorectic applications with examples being radar, imaging, and processing.

4 Claims, 20 Drawing Sheets

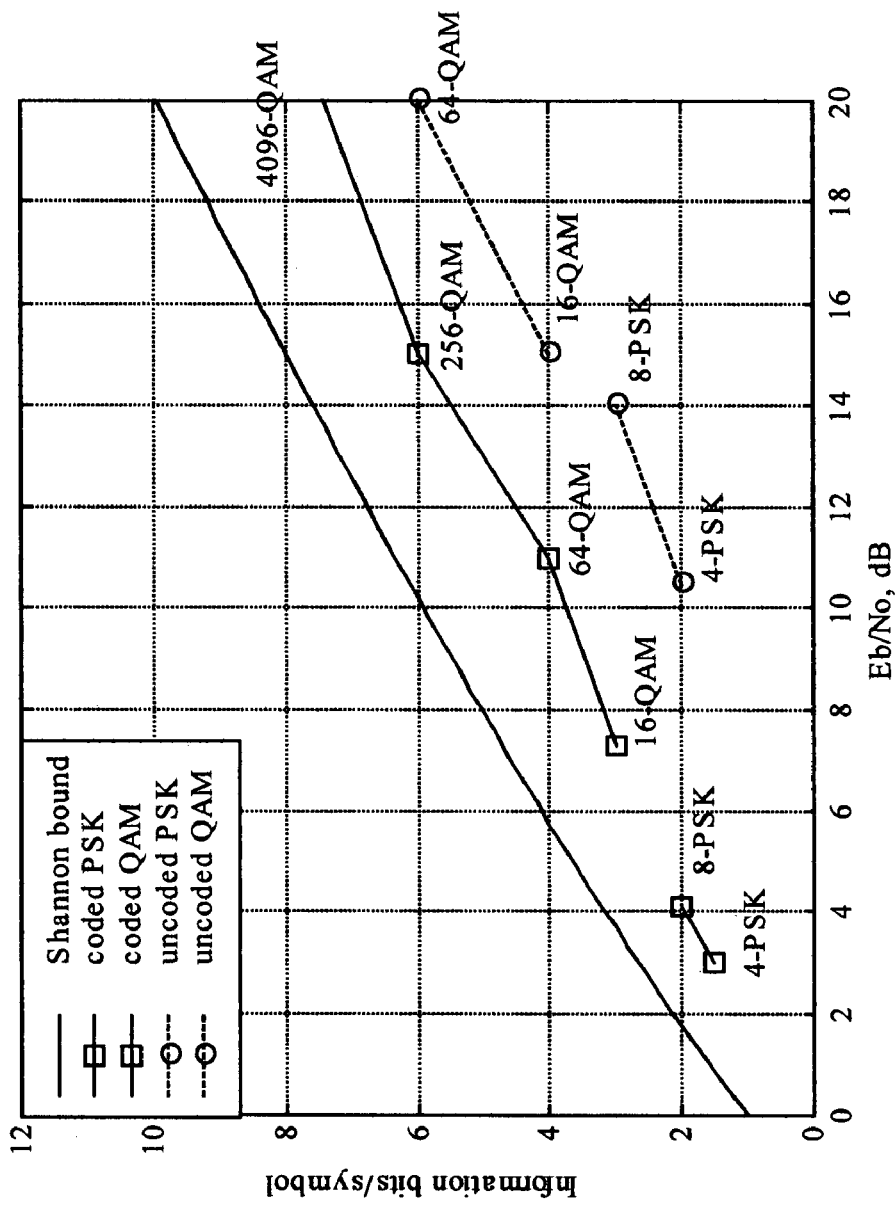
FIG. 1 Prior Art: Information bits/symbol b vs. $E_b/N_o$ for Shannon bound, PSK, QAM

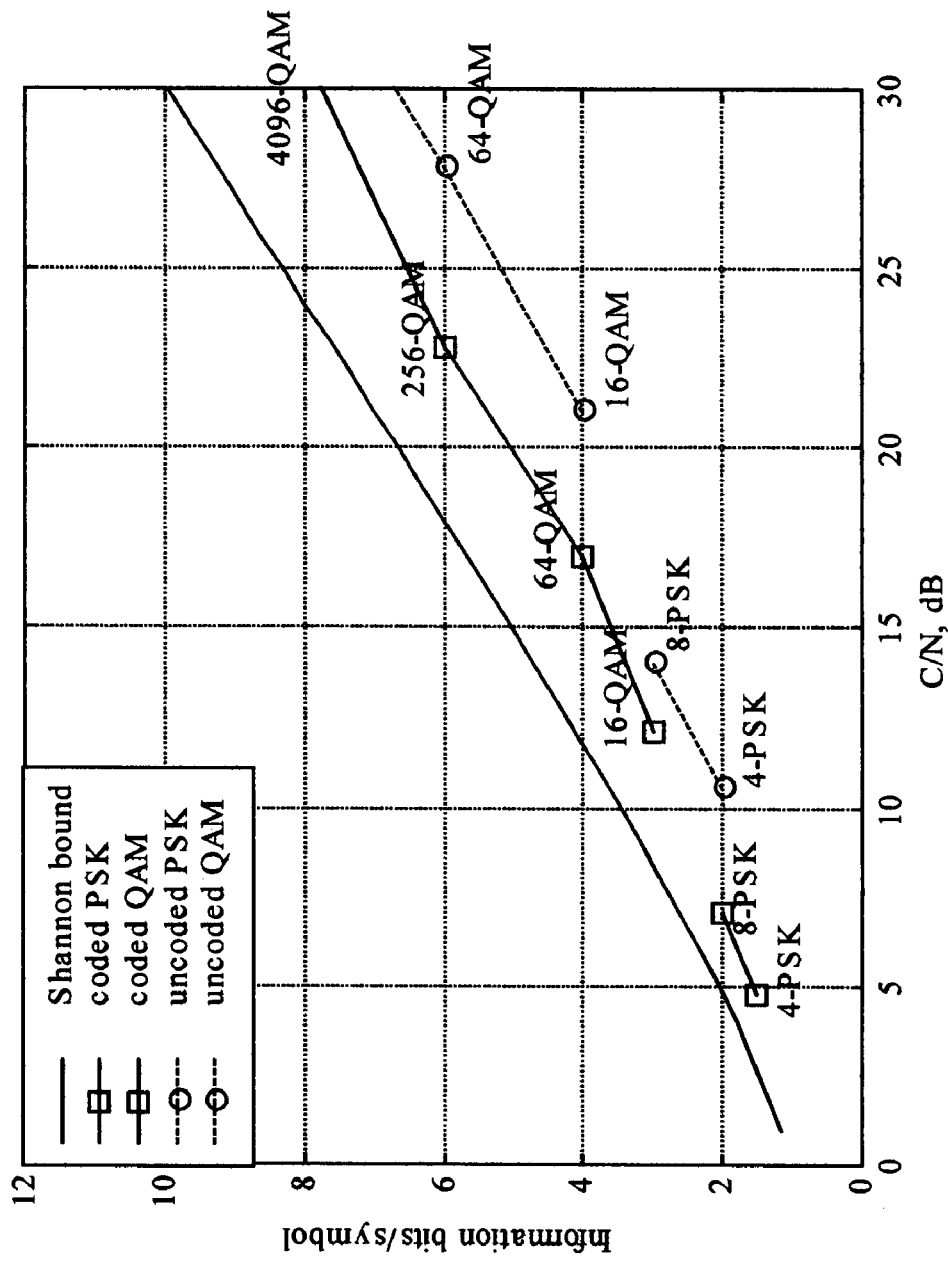
FIG. 2 Prior Art: Information bits/symbol b vs. S/N for Shannon bound, PSK, QAM

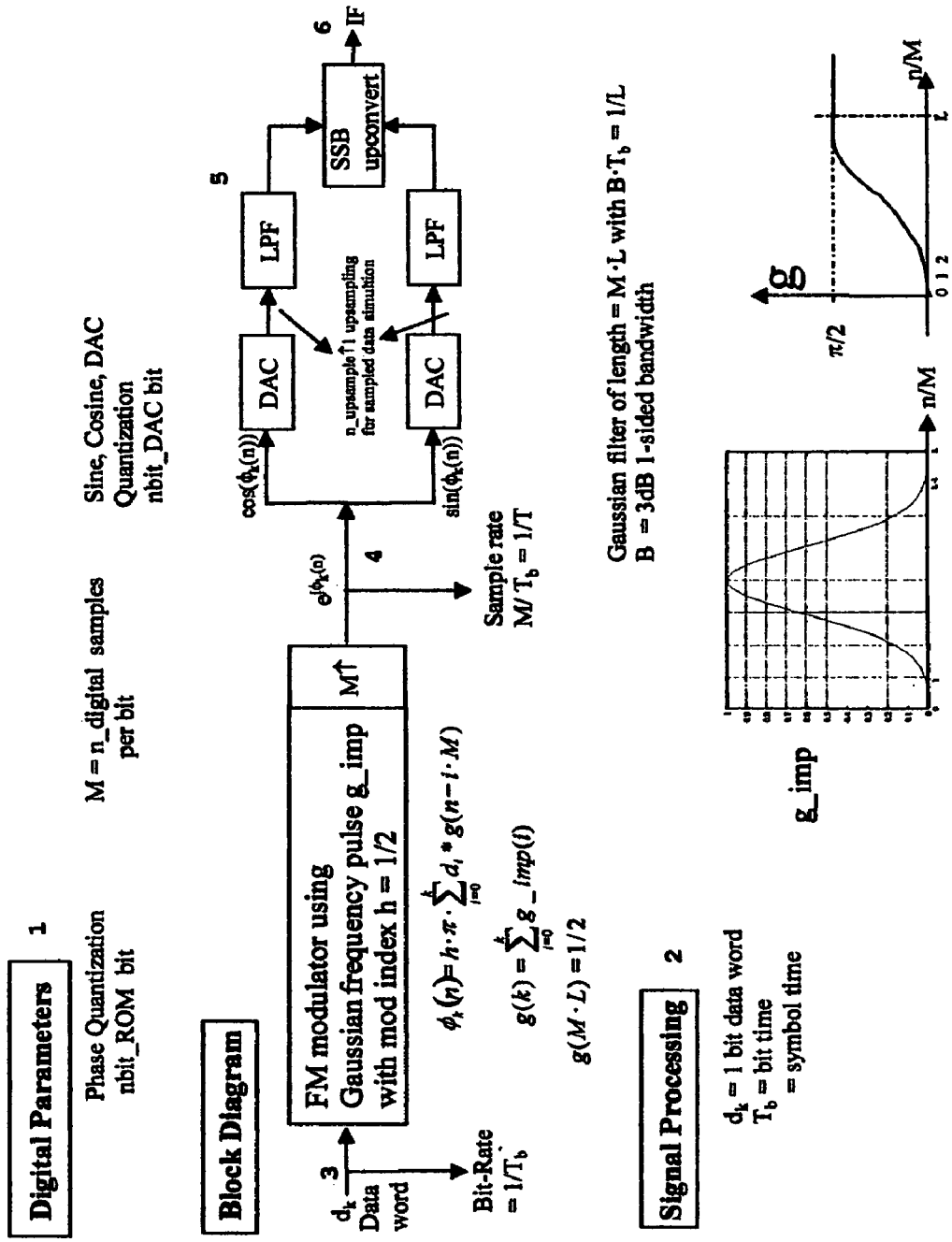
FIG. 3  Prior Art: GMSK Modulator Block Diagram

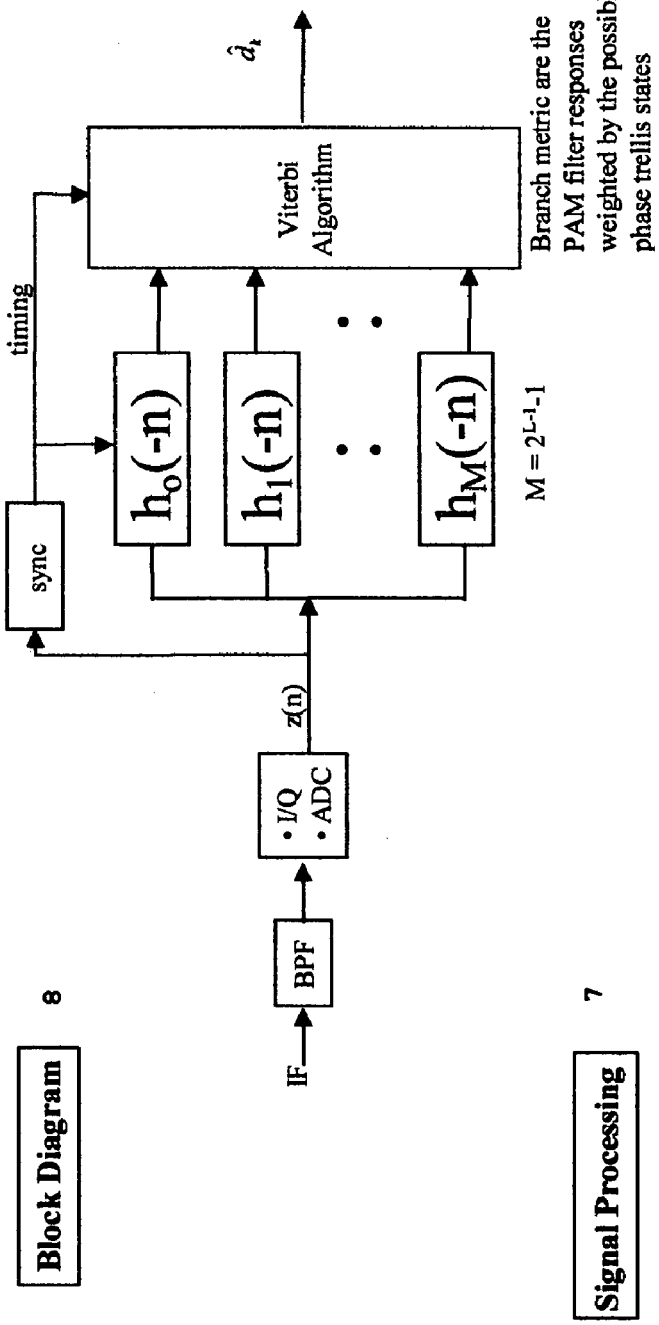
FIG. 4 Prior Art: GMSK Demodulator Block Diagram

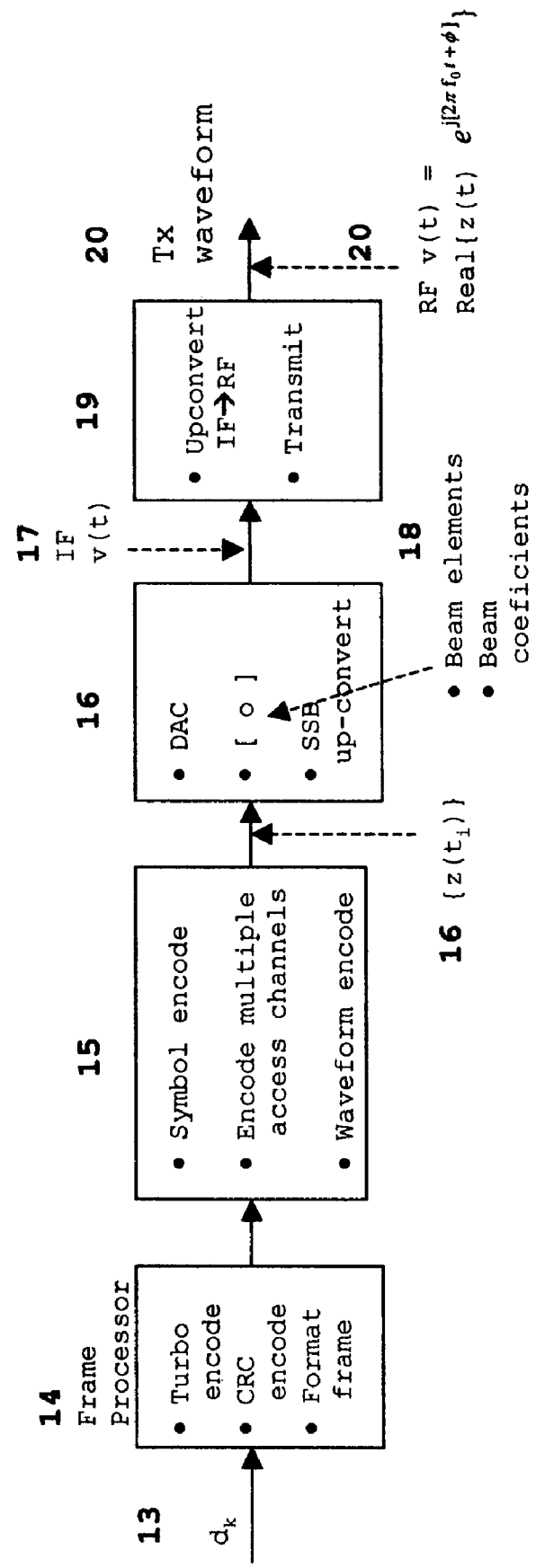
FIG. 5  Prior Art: Modulation Transmitter Block Diagram

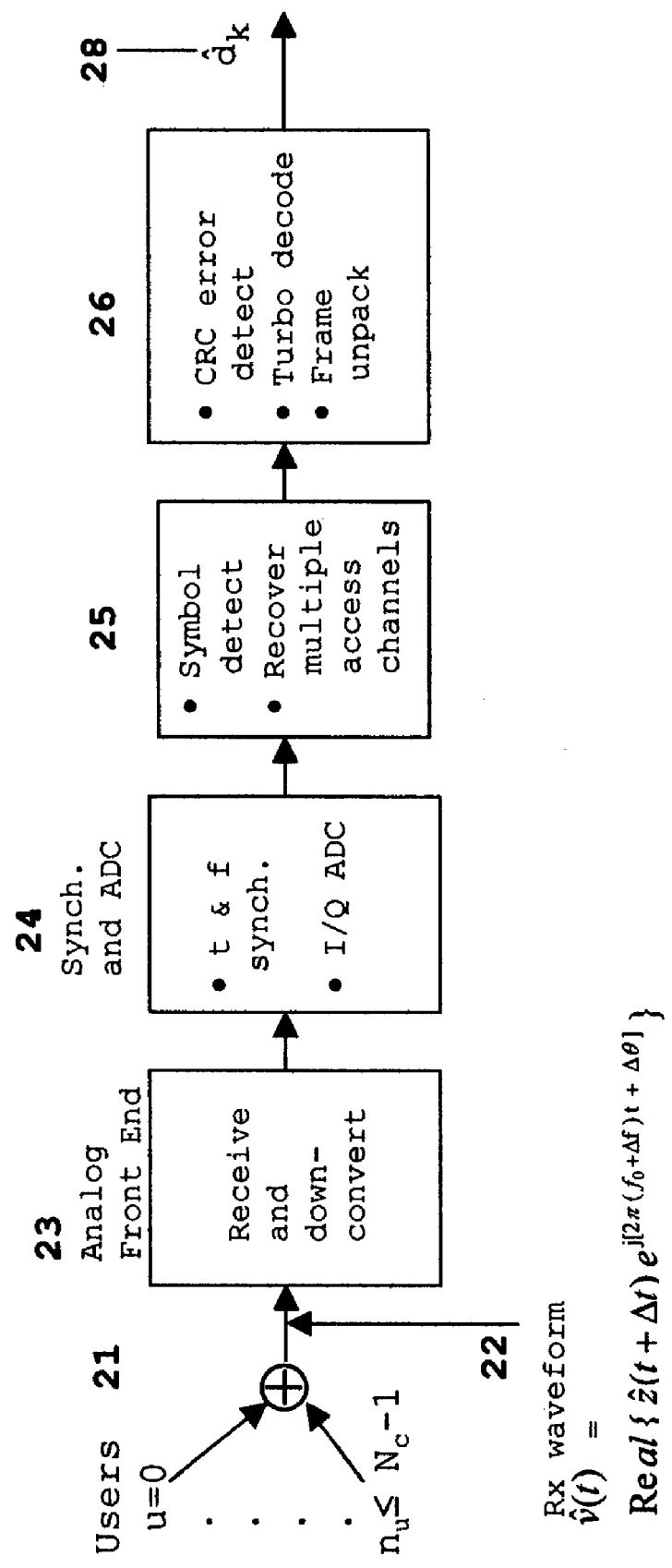
FIG. 6 Prior Art: Demodulation Receiver Block Diagram

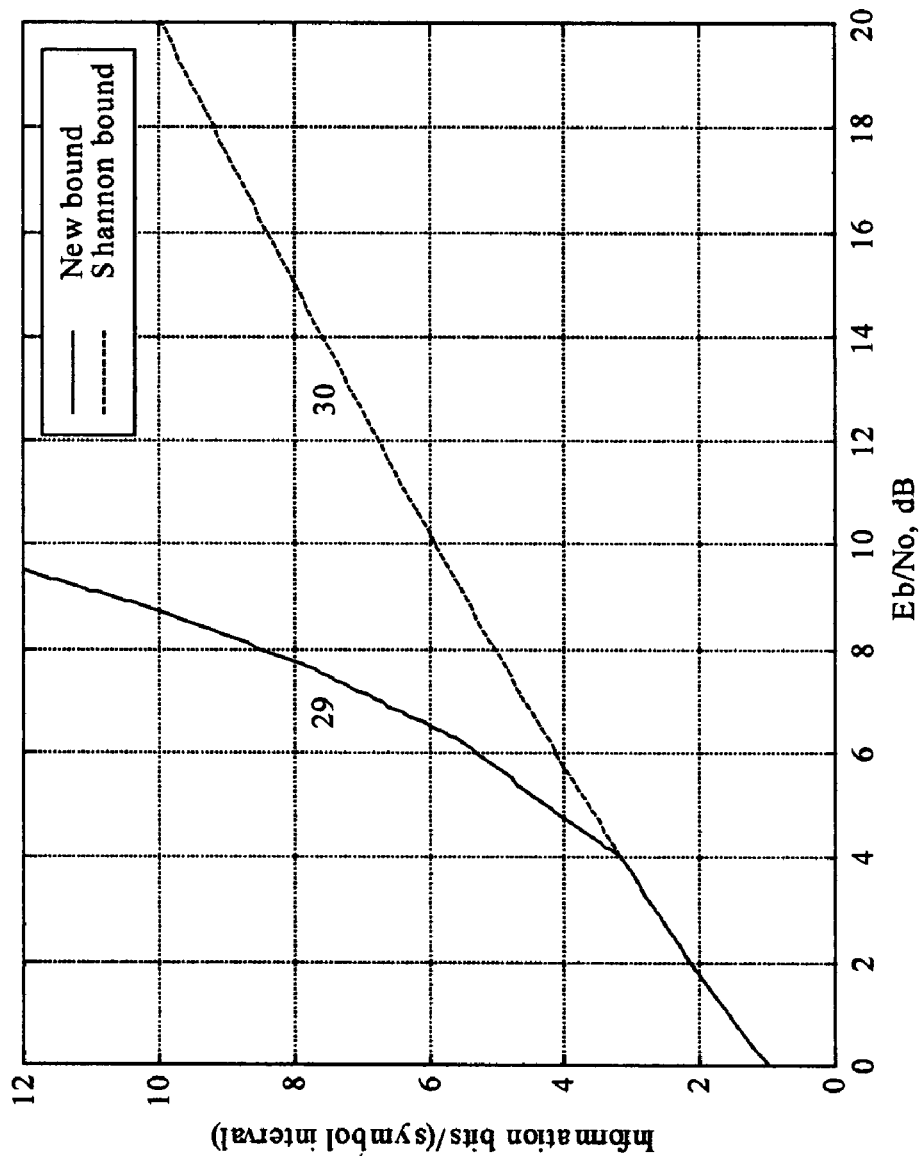
FIG. 7 Information bits/(symbol interval) vs. $E_b/N_o$ for new bound and Shannon bound

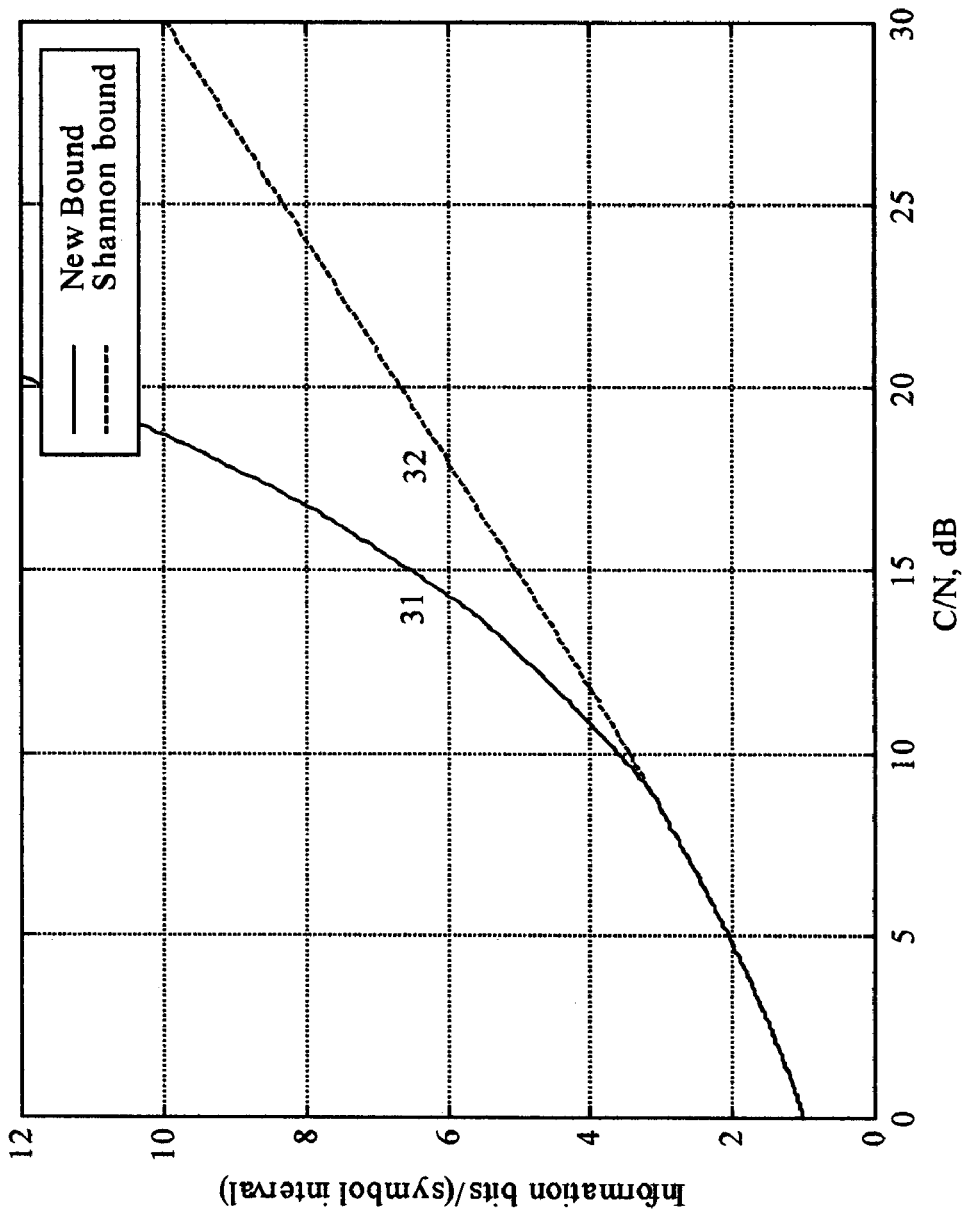
FIG. 8 Information bits/(symbol interval) vs. S/N for new bound and Shannon bound

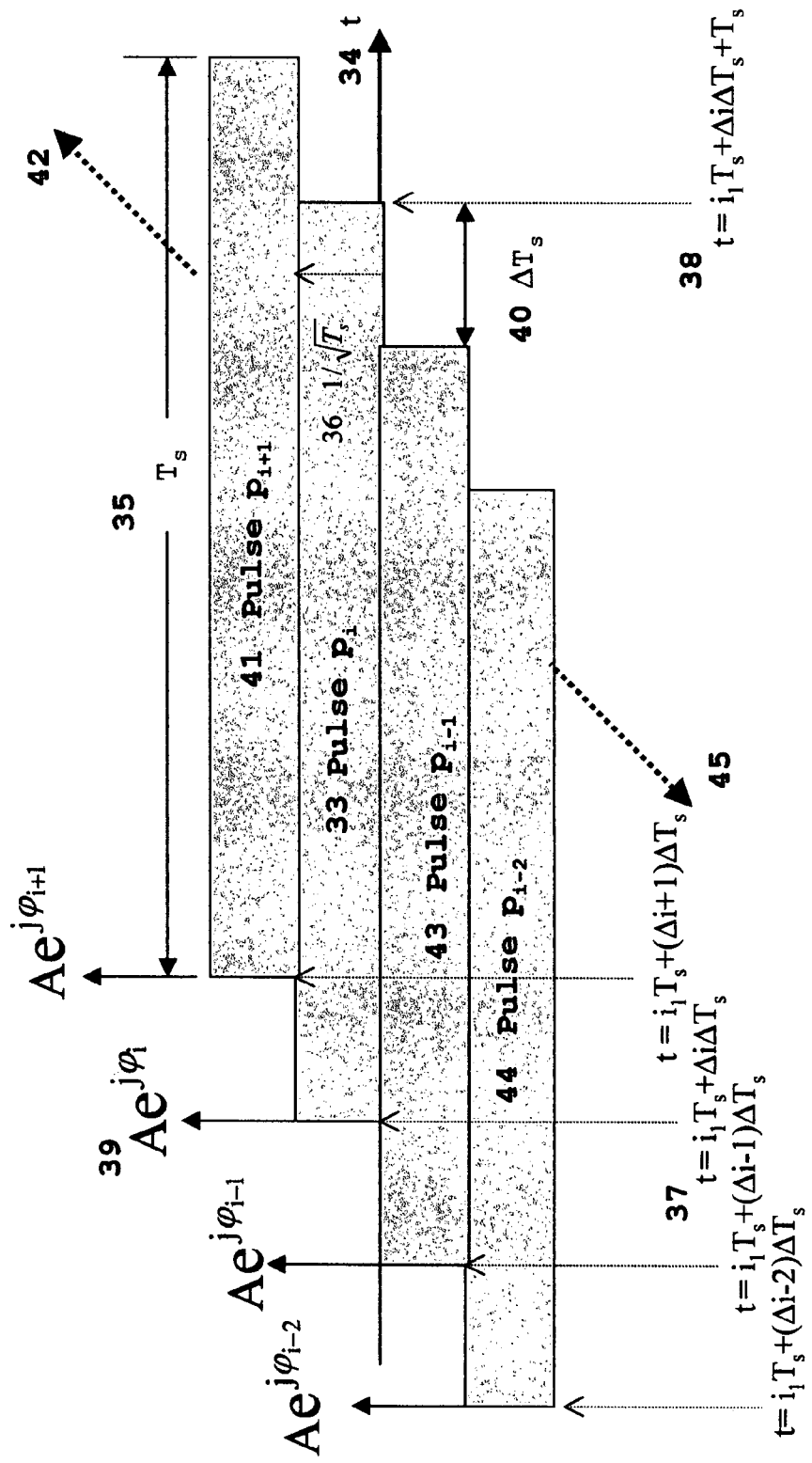

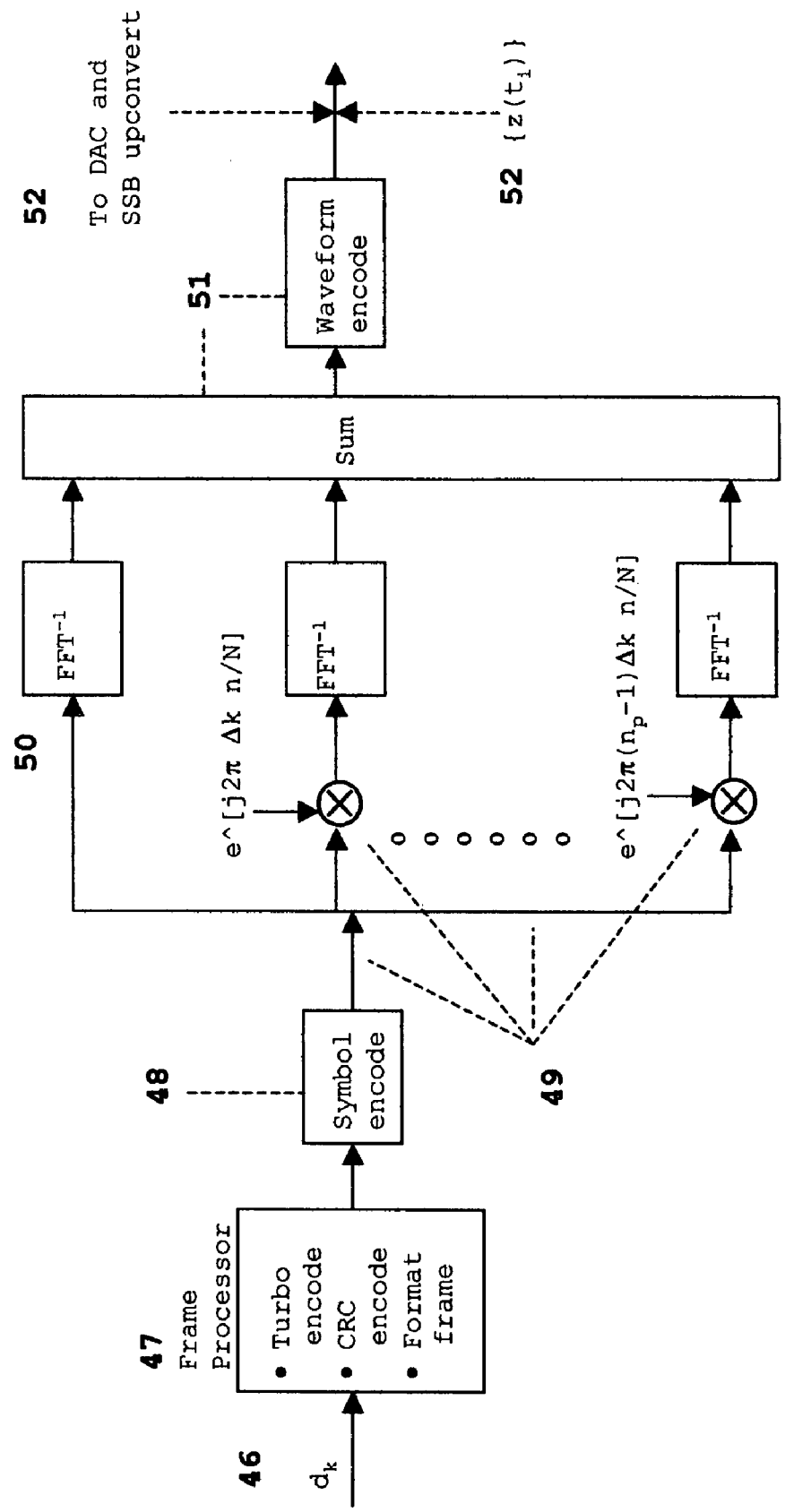
FIG. 10A QLM Transmitter Block Diagram for OFDMA

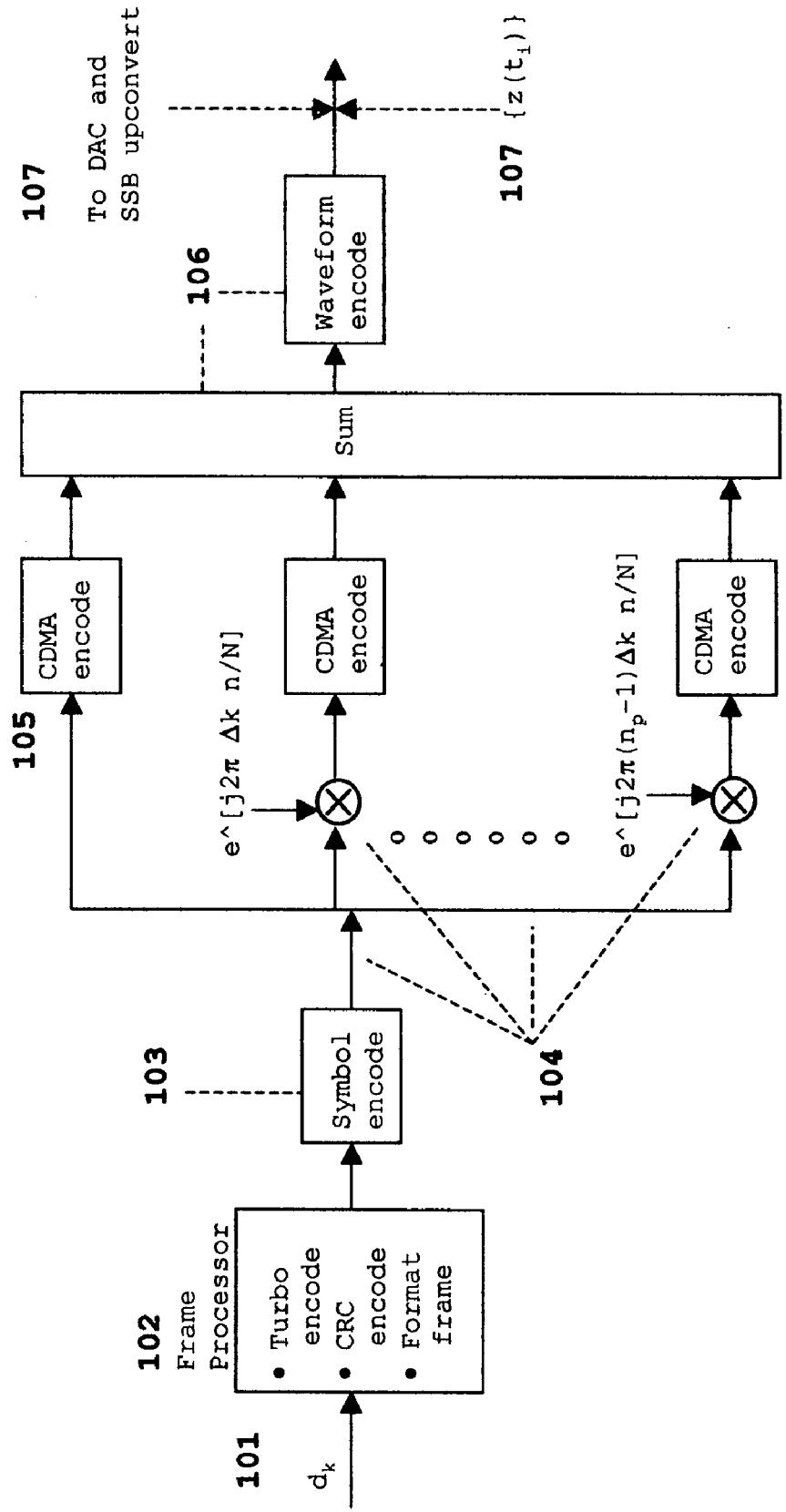
FIG. 10B QLM Transmitter Block Diagram for CDMA

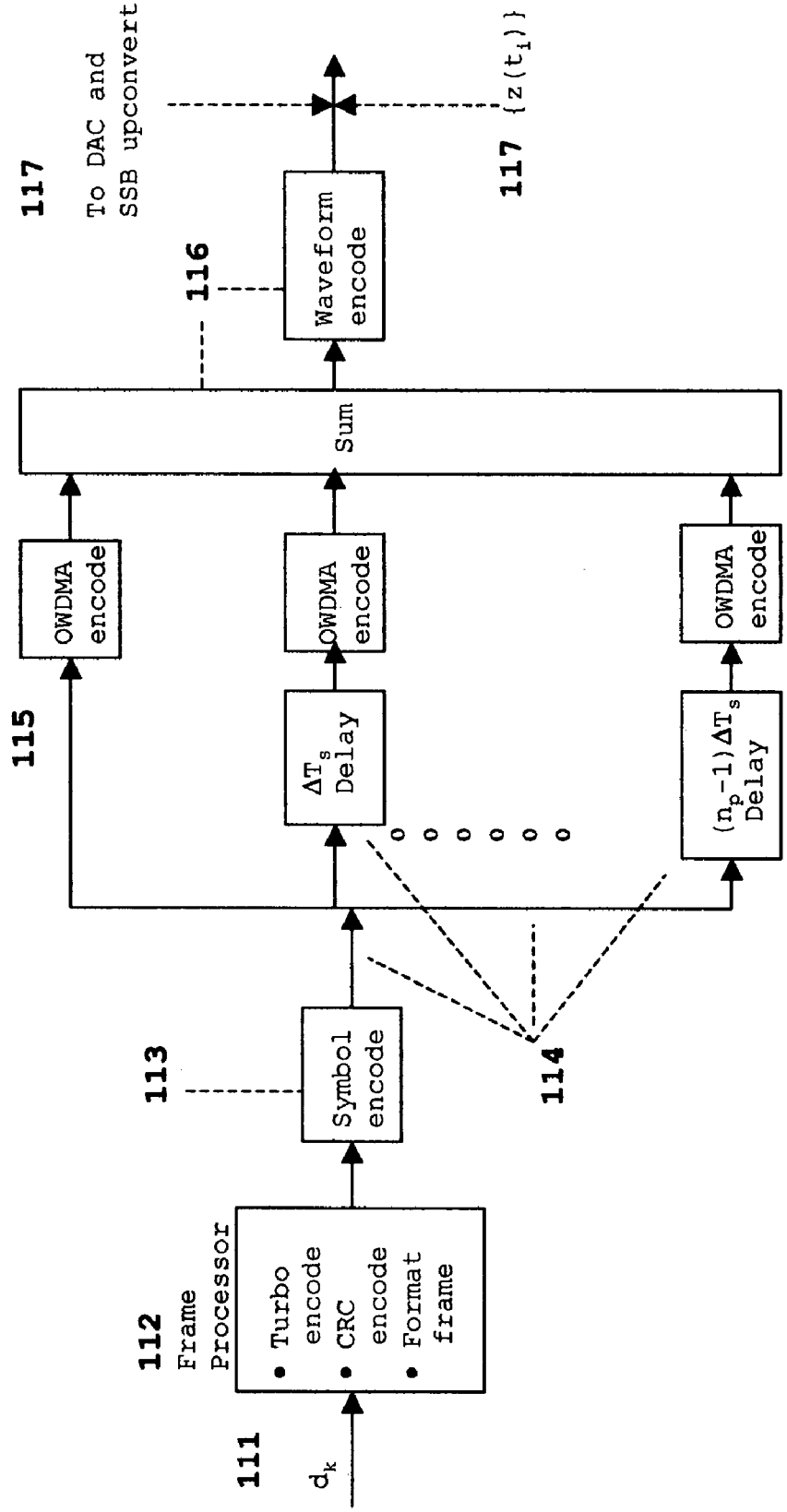
FIG. 10C QLM Transmitter Block Diagram for OWDMA

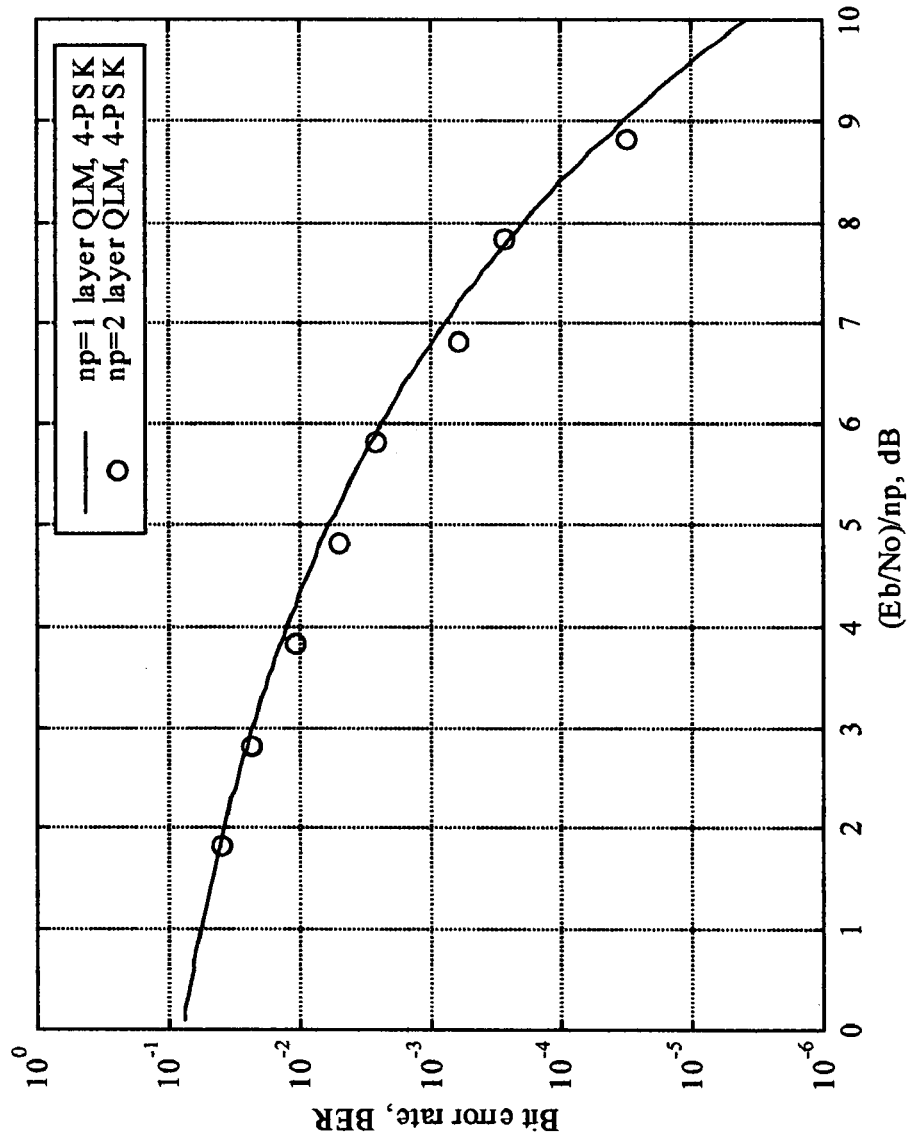
FIG. 11 QLM BER Performance for uncoded QLM for 4-PSK, $n_p = 1, 2$ layers

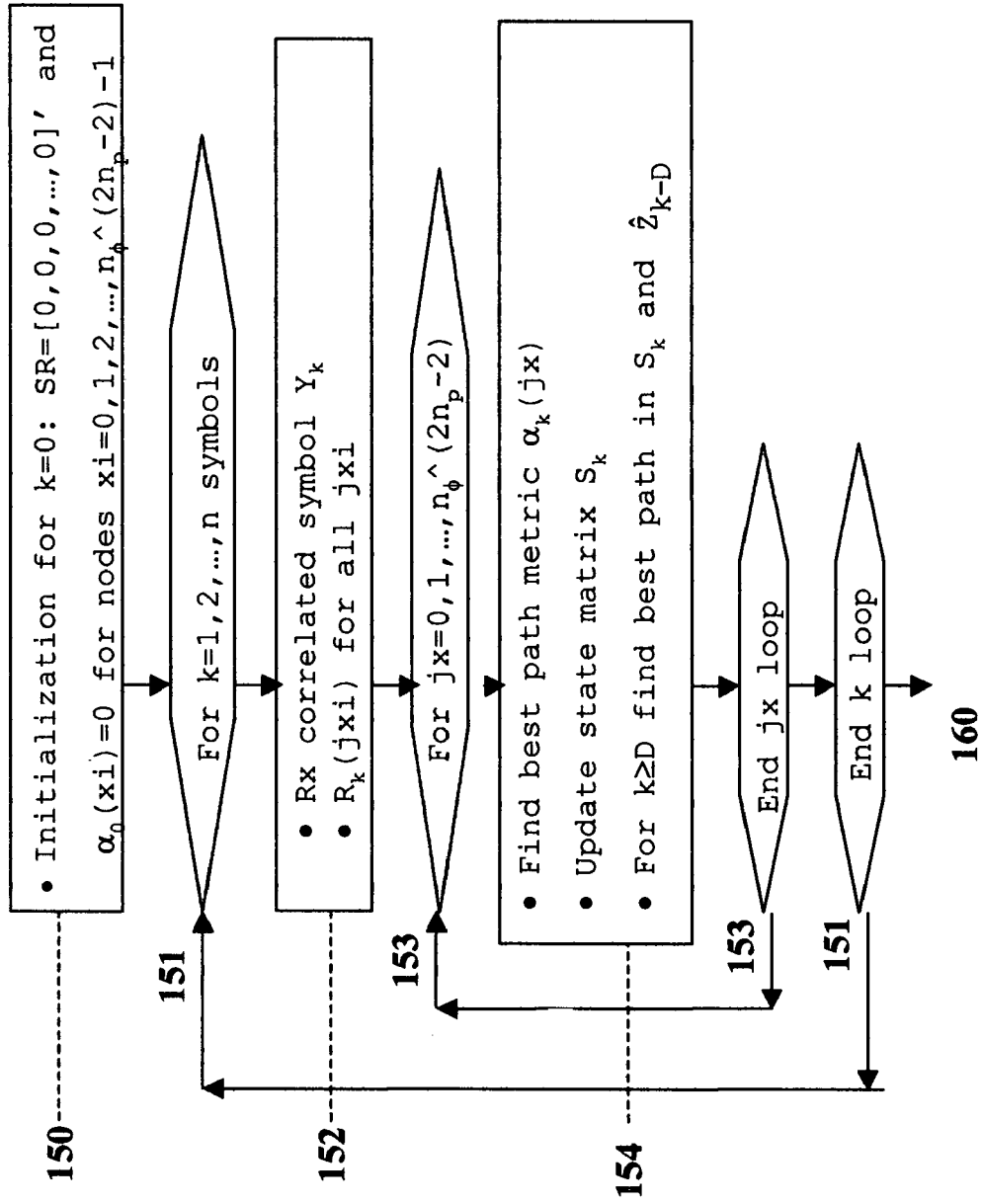
FIG. 12A Trellis Algorithm for QLM demodulation

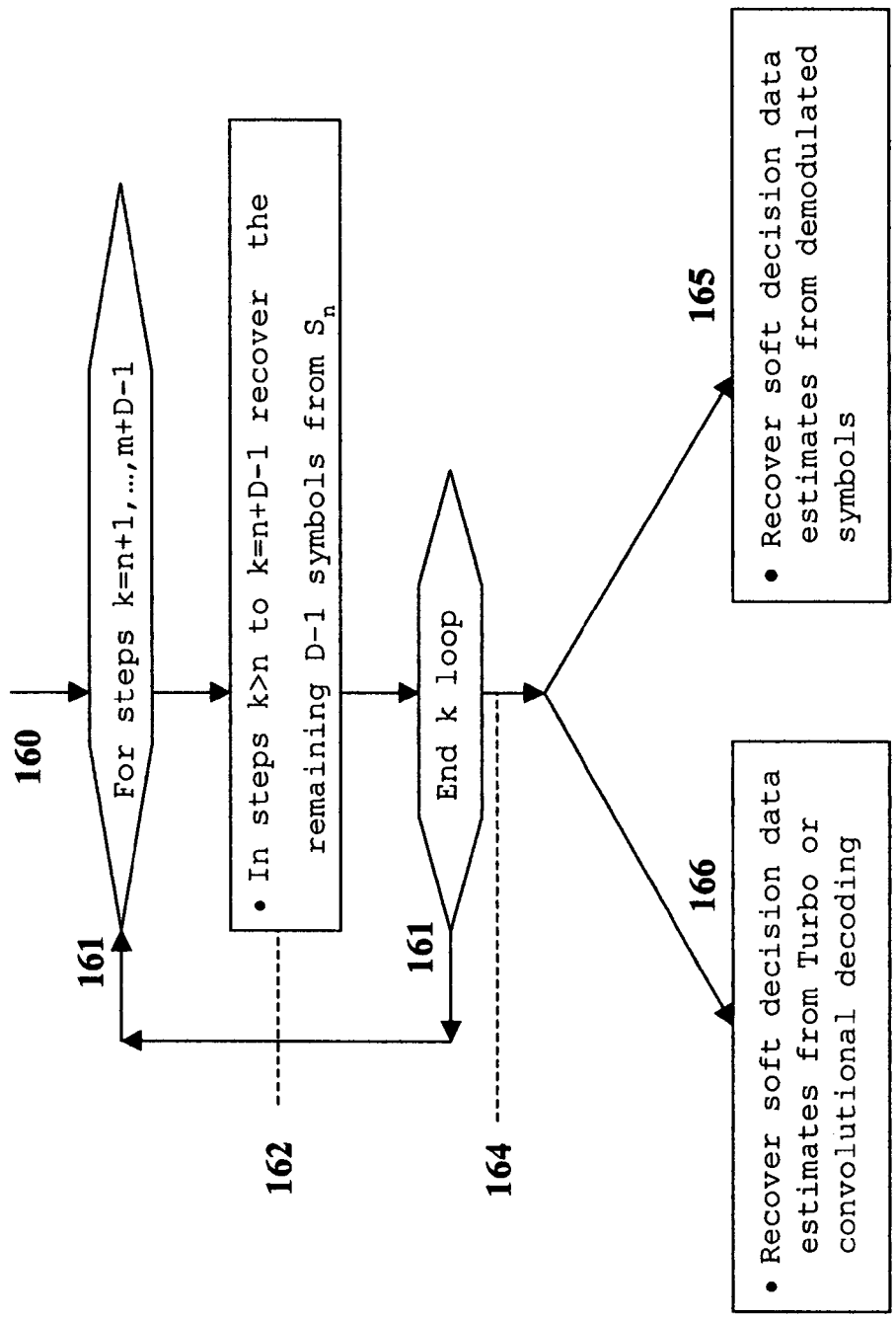
FIG. 12B Trellis Algorithm - Continued

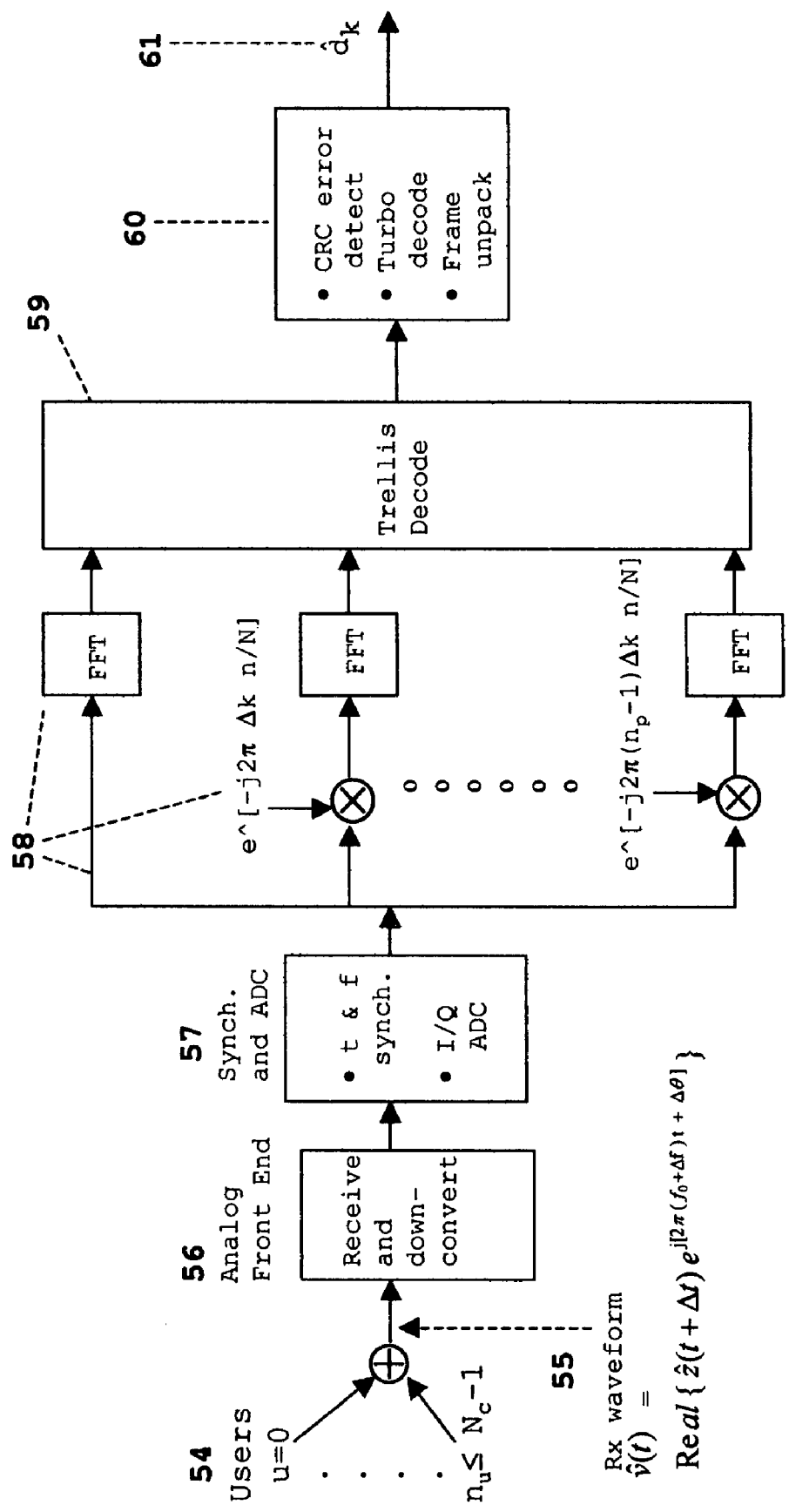
FIG. 13A QLM Receiver Block Diagram for OFDMA

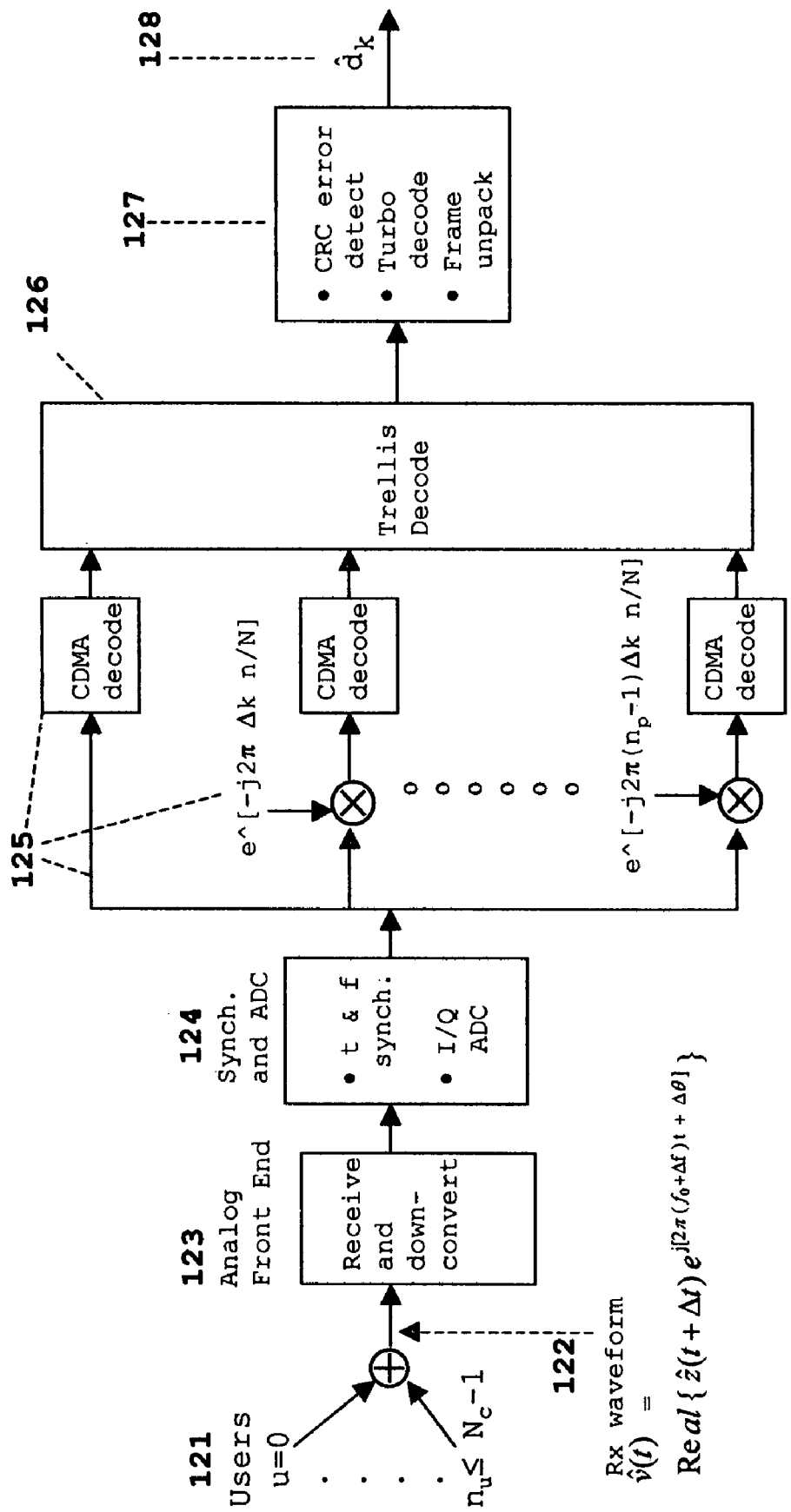
FIG. 13B QLM Receiver Block Diagram for CDMA

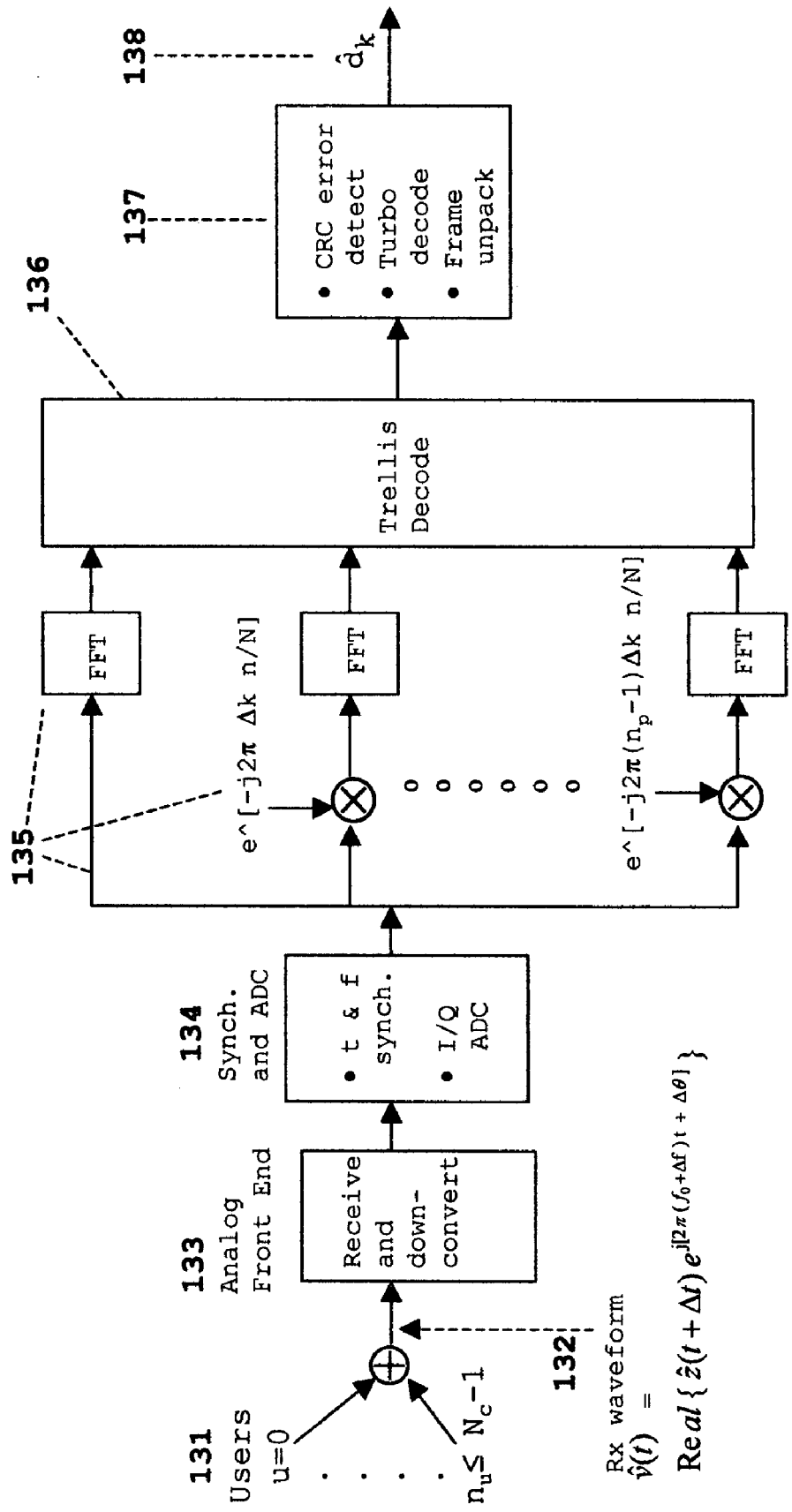
FIG. 13C QLM Receiver Block Diagram for OWDMA

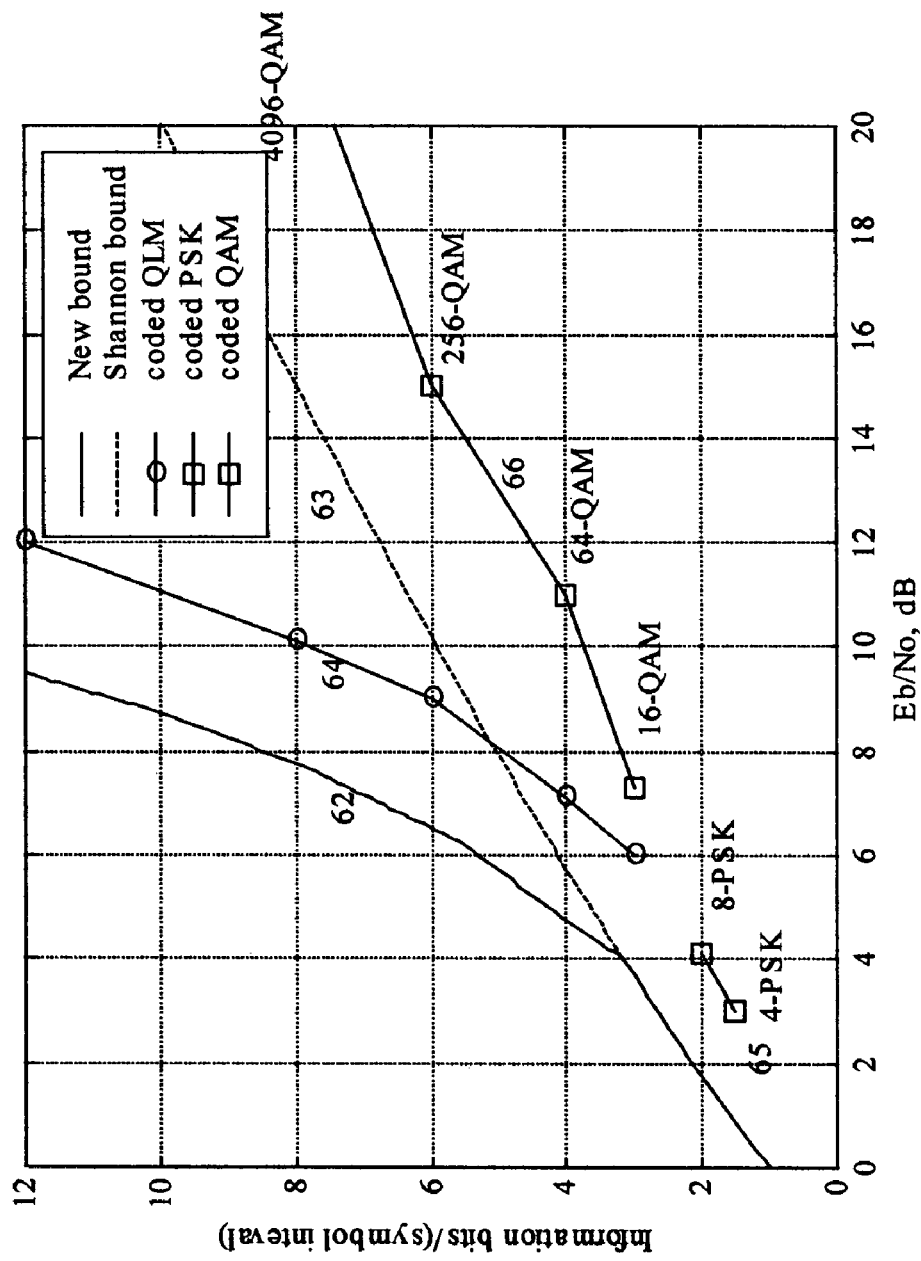
FIG. 14 Information bits/(symbol interval) vs. $E_b/N_o$ for new bound, Shannon bound and for coded QLM, PSK, QAM at BER=1e-6

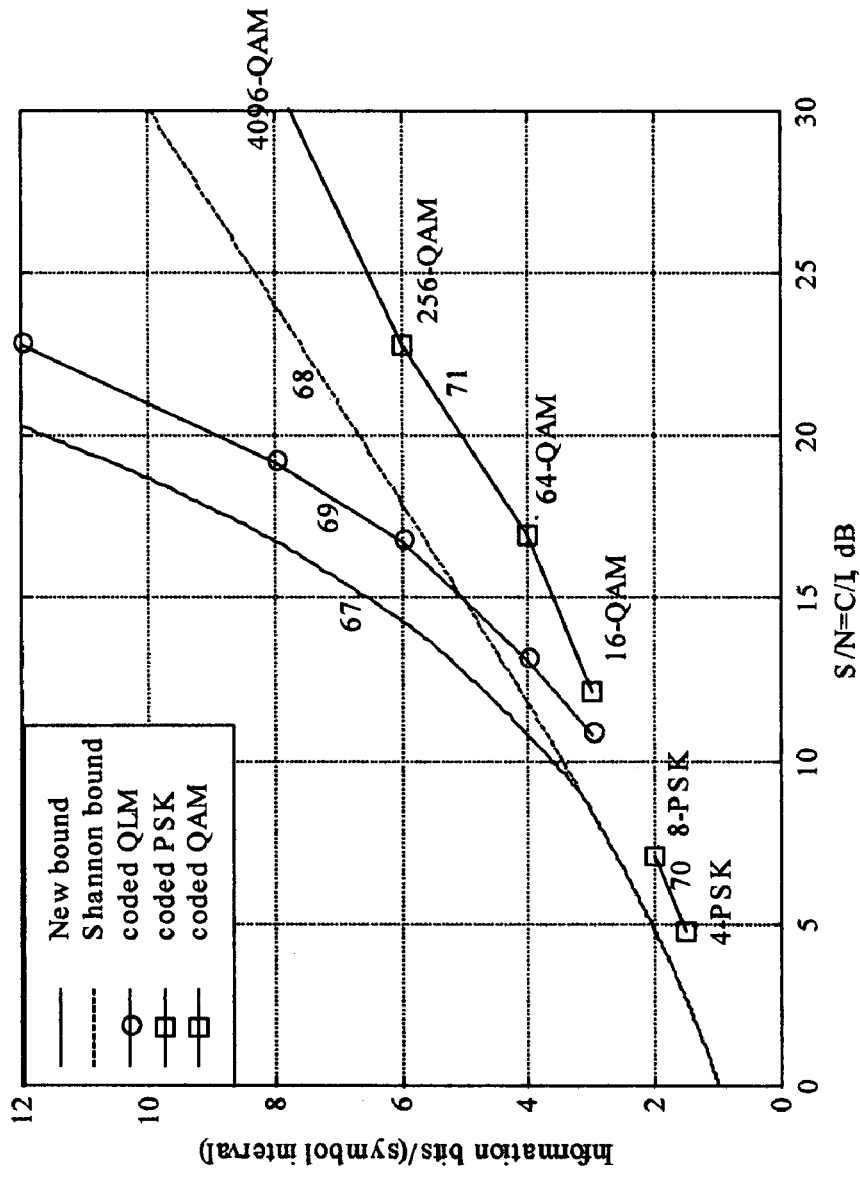
FIG. 15 Information bits/(symbol interval) vs. S/N=C/I for new bound, Shannon bound, and for coded QLM, PSK, QAM at BER=1e-6

CAPACITY BOUND AND MODULATION FOR COMMUNICATIONS

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

CROSS-REFERENCE TO RELATED APPLICATIONS

U.S. PATENT DOCUMENTS

| | | |
|---|---|---|
| U.S. 2002/010193 | August 2002 | Wright et al |
| U.S. 2002/0031189 | March 2002 | Hiben et al |
| U.S. Pat. No. 7,010,048 | March 2006 | Shattil, Steven J. |
| U.S. 2002/0176486 | November 2002 | Okubo et al |
| U.S. 2002/0126,741 | September 2002 | Baum et.al |
| U.S. Pat. No. 6,430,722 | August 2002 | Eroz et.al. |
| U.S. Pat. No. 6,396,804 | May 2002 | Oldenwalder, Joseph P. |
| U.S. Pat. No. 6,396,423 | May 2002 | Laumen et.al. |
| U.S. Pat. No. 6,393,012 | May 2002 | Pankaj et.al. |
| U.S. Pat. No. 6,389,138 | May 2002 | Li et.al. |
| U.S. Pat. No. 6,366,624 | April 2002 | Balachandran et.al. |
| U.S. Pat. No. 6,362,781 | March 2002 | Thomas et.al. |
| U.S. Pat. No. 6,356,528 | March 2002 | Lundby et.al. |
| U.S. Pat. No. 6,353,638 | March 2002 | Hottinen et.al. |
| U.S. Pat. No. 6,351,832 | February 2002 | Wei |
| U.S. Pat. No. 6,185,246 | February 2002 | Gilhousen et.al. |
| U.S. Pat. No. 6,317,466 | November 2001 | Fuschini et.al. |
| U.S. Pat. No. 6,317,413 | November 2001 | Honkasalo, Zhi-Chun |
| U.S. Pat. No. 6,308,294 | October 2001 | Ghosh et.al. |
| U.S. Pat. No. 6,239,767 | May 2001 | Rossi et.al. |
| U.S. Pat. No. 6,167,079 | December 2000 | Kinnunen et.al. |
| U.S. Pat. No. 6,160,854 | December 2000 | Heegard et.al. |
| U.S. Pat. No. 6,157,611 | December 2000 | Shanbhag, Abhijit G. |
| U.S. Pat. No. 6,088,347 | August 2000 | Minn et.al. |
| U.S. Pat. No. 5,956,345 | September 1999 | Allpress et.al |
| U.S. Pat. No. 5,943,361 | August 1999 | Gilhousen et.al. |
| U.S. Pat. No. 5,946,344 | August 1999 | Warren et.al. |
| U.S. Pat. No. 5,862,453 | January 1999 | Love et.al. |
| U.S. Pat. No. 5,848,105 | December 1998 | Gardner et.al. |
| U.S. Pat. No. 5,805,567 | September 1998 | Ramesh, Nallepilli S. |
| U.S. Pat. No. 5,790,570 | August 1998 | Heegard et.al. |
| U.S. Pat. No. 5,715,236 | February 1998 | Gilhousen et.al. |
| U.S. Pat. No. 5,583,892 | December 1996 | Drakul et.al. |
| U.S. Pat. No. 5,442,625 | August 1995 | Gitlin et.al. |
| U.S. Pat. No. 5,311,176 | May 1994 | Gurney, David P. |
| U.S. Pat. No. 5,103,459 | April 1992 | Gilhousen et.al. |

U.S. PATENT APPLICATIONS

| | | |
|---|---|---|
| U.S. Pat. No. 09/846,410 | February 2001 | Urbain von der Embse |
| U.S. Pat. No. 09/826,118 | January 2001 | Urbain von der Embse |
| U.S. Pat. No. 09/826,117 | January 2001 | Urbain von der Embse |

OTHER PUBLICATIONS

J. M. Wozencraft and I. M. Jacobs's book "Principles of Communication Engineering", John Wiley & Sons 1965

C. Heegard and S. B. Wicker's book "Turbo Coding", Kluwer Academic Publishers 1999

B. Vucetic and J. Yuan's book "Turbo Codes", Kluwer Academic Publishers 2000

J. G. Proakis's book "Digital Communications". McGraw Hill, Inc. 1995

L. Hanzo, C. H. Wong, M. S. Lee's book "Adaptive Wireless Transceivers", John Wiley & Sons 2002

C. E. Shannon "A Mathematical Theory of Communications", Bell System Technical Journal, 27:379-423, 623-656, October 1948

"Broadband CDMA Techniques", by Adachi et. al., pp. 8-18, IEEE Wireless Communications, April 2005, Vol. 12, No. 2

"Special Issue on MIMO Wireless Communications", IEEE Trans. on Signal Processing, November 2003, Vol. 51, No. 11

"Special Issue on Space-Time Transmission, Reception, Coding and Signal Processing", IEEE Trans. on Info. Theory, October 2003, Vol. 49, No. 10

"Turbo coding, turbo equalization, and space-time coding" by Hanzo et. al. IEEE Press, John Wiley & Sons, 2002

"Adaptive wireless transceivers: Turbo-coded, turbo-equalized and space-time coded TDMA, CDMA, OFDMA systems' by Hanzo et. al. IEEE Press, John Wiley & Sons, 2002

"Multiple Access for Broadband. Networks", IEEE Communications magazine July 2000 Vol. 38 No. 7

"Third Generation Mobile Systems in Europe", IEEE Personal Communications April 1998 Vol. 5 No. 2

BACKGROUND OF THE INVENTION

I. Field of the Invention

The present invention relates to the Shannon bound on communications capacity and also relates to symbol modulation for high-data-rate wired, wireless, and optical communications and includes the symbol modulations phase-shift-keying PSK, quadrature amplitude modulation QAM, bandwidth efficient modulation BEM, gaussian minimum shift keying GMSK, pulse position modulation PPM, and the plurality of current and future modulations for single links and multiple access links which include time division multiple access TDMA, orthogonal frequency division multiple access OFDMA, code division multiple access CDMA, spatial division multiple access SDMA, frequency hopping FH, optical wavelength division multiple access WDMA, orthogonal Wavelet division multiple access OWDMA, pulse position modulation PPM, combinations thereof, and the plurality of radar, optical, laser, spatial, temporal, sound, imaging, and media applications. Communication application examples include electrical and optical wired, mobile, point-to-point, point-to-multipoint, multipoint-to-multipoint, cellular, and satellite communication networks.

II. Description of the Related Art

The Shannon bound is the Shannon capacity theorem for the maximum data rate C and equivalently can be restated as a bound on the corresponding number of modulation bits per symbol as well as a bound on the communications efficiency and is complemented by the Shannon coding theorem. From Shannon's paper "A Mathematical Theory of Communications" Bell System Technical Journal, 27:379-423, 623-656, October 1948 and B. Vucetic and J. Yuan's book "Turbo Codes", Kluwer Academic Publishers 2000, the Shannon capacity theorem, the corresponding Shannon bound on the information bits per symbol b=bits/symbol=bits/($T_s$ interval), the Shannon bound on the communications efficiency η, and the Shannon coding theorem can be written as equations (2).

Shannon bounds and coding theorem

1. Shannon capacity theorem $C = B \log_2(1+S/N)$, bits/second

= Channel capacity in bits/second for an additive white Gaussian noise AWGN channel with bandwidth B = Maximum rate at which information can be reliably transmitted over a noisy channel where S/N is the signal-to-noise ratio in B 2. Shannon bound on b and η

Using equations (1) and the assumption that the symbol rate $(1/T_s)$ is maximized when equal to the bandwidth B which is equivalent to the equation $T_s B = 1$, enables the equation for C to be rewritten to calculate max{b} as a function of S/N, and to calculate $E_b/N_o$ as a function of the max{b} which reads the maximum value of the number of information bits per symbol b. Since the communications efficiency $\eta = b/(T_s B)$ in bits/sec/Hz it follows that maximum values of b and η are equal.

$\max\{b\} = \log_2(1+S/N) = \max\{\eta\}$ $E_b/N_o = [2^{\max\{b\}} - 1]/\max\{b\}$ 3. Shannon coding theorem for the information bit rate $R_b$ For $R_b < C$ there exists codes which support reliable communications For $R_b > C$ there are no codes which support reliable communications      (2)

wherein $E_b$ is the energy per bit b, $N_o$ is the noise power density. and $S/N = bE_b/N_o$. Reliable communications in the statement of the Shannon coding theorem 3 means an arbitrarily low bit error rate BER.

Current communications performance is represented by the Shannon bound, QAM, and PSK performance for b vs. $E_b/N_o$ and for b vs. S/N in FIGS. 1, 2 respectively. FIG. 1 plots the number of information bits per symbol b versus measured $E_b/N_o$ for 4-PSK, 8-PSK, 16-QAM, 64-QAM, 256-QAM, 4096-QAM for both uncoded and Turbo coding. The 4-PSK, 8-PSK are 4-phase, 8-phase phase shift keying modulations which respectively encode 2,3 bits per symbol and 16-QAM, 64-QAM, 256-QAM, 1024-QAM are 16, 64, 256, 4096 state QAM modulations which respectively encode 4, 6, 8, 12 bits. For no coding the information bits per symbol b is equal to the modulation bits per symbol $b_s$ so that $b = b_s = 2, 3, 4, 6, 8, 12$ bits per symbol respectively for 4-PSK, 8-PSK, 16-QAM, 64-QAM, 256-QAM, 4096-QAM. FIG. 2 plots b versus measured S/N for these modulations for both uncoded and Turbo coding. Shannon bound performance is calculated using equations (2). Turbo coding performance assumes a modest 4 state recursive systematic convolutional code RSC, 1024 bit interleaver, and 4 Turbo decoding iterations. The assumed coding rates R=¾, ⅔, ¾, ⅔, ¾, ⅔ reduce the information bits per symbol to the respective values $b = b_s = 1.5, 2, 3, 4, 6, 8$ bits. Performance data is from C. Heegard and S. B. Wicker's book "Turbo Coding", Kluwer Academic Publishers 1999, B. Vucetic and J. Yuan's book "Turbo Codes", Kluwer Academic Publishers 2000, J. G. Proakis's book "Digital Communications", McGraw Hill, Inc. 1995, L. Hanzo, C. H. Wong, M. S. Lee's book "Adaptive Wireless Transceivers", John Wiley & Sons 2002, and the other listed references.

FIGS. 1 and 2 only consider the 4-PSK and 8-PSK modulations for PSK since 2-PSK is somewhat less efficient than 4-PSK, and 16-PSK is somewhat less efficient than 16-QAM. For $b_s = 4$ bits/symbol=bits/$(T_s$ interval) and higher, only QAM is considered since it is well known to be the more efficient modulation in the sense of requiring the lowest $E_b/N_o$ and S/N for given b, $b_s$ and is well known to be the only modulation capable of supporting to $b_s = 12$ bits/symbol=bits/$(T_s$ interval) and higher.

Gaussian minimum shift keying GMSK modulation and waveform is used for the wireless cellular phone standard GSM and for space and military applications which use GSMK because it is a constant amplitude signal bandwidth efficient modulation BEM and waveform with a relatively high communications efficiency η. A constant amplitude modulation and waveform allows the power amplifier in the transmitter to operate at the saturation level with no backoff required, which is the most efficient operational mode of a power amplifier. With non-constant modulation as well as non-constant signals the input signal to the power amplifier must be backed off 2-to-10 dB in order to maintain linearity of the signal transmitted by the power amplifier. A backoff of 2-to-10 dB means the output signal is 2-to-10 dB lower than the maximum output level of the power amplifier, and this means a loss of 2-to-10 dB in the communications link compared to the transmitted signal level when the output amplifier is operating at the saturation level. This constant signal amplitude advantage of GMSK is only realized for single channel links such as the return link from the user to the hub or access point for cellular networks, and for some space and military applications. For the forward links of cellular networks which simultaneously transmit multiple channels of GMSK the composite transmitted waveform is non-constant and inherently Gaussian in character with no significant envelope advantage over other multiple channel waveforms with respect to the required power amplifier backoff.

FIGS. 3, 4 are representative modulator and demodulator architectures for GMSK. In FIG. 3 the digital parameters 1 identify the bit lengths of the phase quantization, number of digital samples per pulse, and the digital-to-analog conversion DAC. Signal processing 2 parameters are the digital word size, bit duration $T_b$, Gaussian impulse function which is the FM frequency pulse for each symbol, and the integrated value of the impulse function which is the phase. Inputs to the GMSK FM modulator are the stream of digital words 3. Each digital word modulates a Gaussian pulse and the FM modulator integrates this train of overlapping Gaussian frequency pulses to generate the information bearing phase history. The stream of phase angle samples $\{e^{j\Phi_k(n)}\}$ 4 from the GMSK FM modulator are handed over to the inphase and quadrature digital-to-analog converters DACs and low pass filtered LPF 5, outputs are single sideband upconverted to an intermediate frequency 6 and then handed over to the IF-RF front end for transmission.

In FIG. 4 the signal processing 7 parameters for the demodulator identify the received down-converted intermediate frequency IF signal, band-pass filter BPF, inphase and quadrature detector I/Q, analog-to-digital converter ADC, the complex sample rate, complex baseband sample, receive Rx signal amplitude, and the baseband pulse amplitude modulation PAM filters which recover shifted versions of the transmitted integrated Gaussian frequency pulses. The GMSK demodulator 8 receives the IF signal from the RF-IF front end, performs bandpass filtering, recovers the inphase and quadrature baseband I/Q components which are digitized by the ADC. Digitized signals are synchronized, filtered by a bank of pulse amplitude modulation PAM filters to recover GMSK modulation responses which are weighted by the possible trellis states of the maximum likelihood path through the trellis, and the estimated transmitted digital words are then recovered by a maximum likelihood detector or by a Viterbi or maximum a-posteriori MAP type algorithm.

FIG. 5 is a representative modulation transmitter block diagram for implementation. Signal processing starts with the stream of user input data words $\{d_k\}$ 13 with k indexed over the words. Frame processor 14 accepts these data words and performs the error detection cyclic redundant coding CRC and Turbo error correction encoding and frame formatting, and passes the outputs to the modulator 15 which encodes the frame data words into modulated symbols that are waveform encoded by convolving with the waveform impulse response in, combination with the multiple-access channelization. Output encoded complex baseband signal $\{z(t_i)\}$ at the digital sample times $\{t_i\}$ are digital-to-analog DAC converted 16 and single sideband SSB upconverted to the real signal v(t) 17 at an intermediate frequency IF. For multiple beam antennas 18 the beam coefficients for each beam element for each complex digital sample are processed and the individual digital streams are handed off to the corresponding antenna elements where they are SSB upconverted to an IF and processed by the analog front end 19 at each element and the array of elements form the beams and within each beam the transmitted signal is similar to the real radio transmission frequency RF signal v(t) 20 at the RF carrier frequency $f_0$ with an amplitude that is the real part of z(t) with the phase angle φ.

FIG. 6 is a representative demodulation receiver block diagram. Wavefronts 21 incident at the receiver antenna for the $n_u$ users u=1, . . . , $n_u$≦$N_c$ are combined by addition in the antenna to form the receive Rx signal $\hat{v}(t)$ at the antenna output 22 where $\hat{v}(t)$ is an estimate of the transmitted signal v(t) 20 in FIG. 6, that is received with errors in time Δt, frequency Δf, phase Δθ, and with an estimate $\hat{z}(t)$ of the transmitted complex baseband signal z(t) 20 in FIG. 6. This received signal $\hat{v}(t)$ is amplified and downconverted by the analog front end 23 and then synchronized (synch.) and analog-to-digital ADC converted 24. In 25 the waveform is removed to detect the data symbols in combination with the recovery of the symbol inputs to the multiple access channels. In 26 the recovered data symbols are CRC detected. Turbo decoded, and the frame removed by the frame processor 26 to recover estimates $\{\hat{d}_k\}$ 28 of the transmitted user data words.

SUMMARY OF THE INVENTION

This invention introduces the new bound on communications capacity that can be supported by a communications channel with frequency bandwidth B and signal-to-noise ratio S/N, and also introduces the new quadrature parallel-layered modulation QLM. These two inventions are disclosed together since the QLM architecture is used to derive the new bound, and the QLM performance validates the bound by providing a modulation which becomes close to this bound with error correcting codes such as the Turbo codes. QLM is a layered topology for transmitting higher data rates than possible with each layer of communications and is implemented by transmitting each layer with a discriminating parameter which enables separation and decoding of each layer. Performance verification of a representative trellis demodulation algorithm is given for QLM modulation using PSK for each layer. Additional applications for QLM signal processing and bound include the plurality of information theorectic applications.

BRIEF DESCRIPTION OF THE DRAWINGS AND THE PERFORMANCE DATA

The above-mentioned and other features, objects, design algorithms, and performance advantages of the present invention will become more apparent from the detailed description set forth below when taken in conjunction with the drawings and performance data wherein like reference characters and numerals denote like elements, and in which:

FIG. 1 calculates information bits b per symbol versus $E_b/N_o$ for the Shannon bound and for PSK, QAM at BER=1e−6 with Turbo coding and no coding.

FIG. 2 calculates information bits b per symbol versus S/N for the Shannon bound and for the PSK, QAM at BER=1e−6 with Turbo coding and no coding.

FIG. 3 is a representative implementation block diagram for the modulator signal processing for GMSK.

FIG. 4 is a representative implementation block diagram for the demodulator signal processing for GMSK.

FIG. 5 is a representative implementation block diagram for the modulator transmitter.

FIG. 6 is a representative implementation block diagram for the demodulator receiver.

FIG. 7 calculates the performance of the new bound and the Shannon bound as information bits b per symbol interval versus $E_b/N_o$.

FIG. 8 calculates the performance of the new bound and the Shannon bound as information bits b per symbol interval versus S/N.

FIG. 9 illustrates the pulse waveform time offsets for QLM.

FIG. 10A is a representative transmitter implementation block diagram for OFDMA QLM.

FIG. 10B is a representative transmitter implementation block diagram for CDMA QLM.

FIG. 10C is a representative transmitter implementation block diagram for OWDMA QLM.

FIG. 11 presents the measured bit error rate BER performance for uncoded 4-PSK QLM for $n_p$=1, 2 layered QLM in FIG. 9.

FIG. 12A is a flow diagram of the trellis demodulation algorithm used to measure QLM bit error rate BER performance in FIG. 11.

FIG. 12B is the continuation of the flow diagram of the trellis demodulation algorithm in FIG. 11A.

FIG. 13A is a representative receiver implementation block diagram for OFDMA QLM.

FIG. 13B is a representative receiver implementation block diagram for CDMA QLM.

FIG. 13C is a representative receiver implementation block diagram for OWDMA QLM.

FIG. 14 presents the performance of the new bound, Shannon bound, and Turbo coded QLM PSK, PSK, QAM at BER=1e−6 as b versus $E_b/N_o$.

FIG. 15 presents the performance of the new bound, Shannon bound, and Turbo coded QLM PSK, PSK, QAM at BER=1e−6 as b versus S/N.

DISCLOSURE OF THE INVENTION

Quadrature parallel-layered modulation is a new invention that increases the data rate supported by a channel by adding layers of independent communications channels or signals over the existing communications such that each layer can be uniquely separated and demodulated in the receiver. These layers of communications channels are parallel sets of communications channels occupying the same bandwidth B as the $1^{st}$ layer which is the original set of communications channels occupying the bandwidth B. The QLM quadrature parallel-layered modulation can also be viewed as the addition of parallel communications which are layered over the same bandwidth B as the original communications. Layering of parallel channels or signals is not necessarily an addition of signals in the algebra of the real or complex field since for example for GMSK the layering is in the frequency domain of the FM signal.

The new bound on communications capacity recognizes that one can increase the average symbol rate from the value assumed in the Shannon bound $T_sB=1$ in equations (2) to the value $T_sB=1/n_p$ with $n_p$ layers of the communications or equivalently with the addition of $(n_p-1)$ parallel communications channels with differing characteristics which make them separable and recoverable in the receiver with implementation of a trellis type demodulation algorithm or the equivalent in terms of capabilities and performance where "equivalent" includes the plurality of all possible mathematical techniques to provide alternative solutions compared to the broad class of trellis algorithms. In this patent disclosure the term "separable" is intended to mean there is a discriminating parameter or equivalently a differentiating parameter which allows the $n_p$ layers or equivalently channels to be uniquely recoverable.

GMSK quadrature parallel-layered modulation QLM referred to as GMSK QLM increases the data rate by transmitting $n_p \geq 1$ layers of data encoded Gaussian frequency pulses that are time synchronized for transmission at $T_s/n_p$, $2T_s/n_p$, ..., $(n_p-1)T_s/n_p$ offsets respectively for layers 2, 3, ..., $(n_p-1)$ relative to the $1^{st}$ layer of GMSK. Demodulation uses a trellis algorithm that is somewhat more general and powerful than the Viterbi algorithm in FIG. 4. Other BEM QLM applications will use an equivalent approach to constructing the QLM layers and for demodulation.

OFDMA quadrature parallel-layered modulation QLM can increase the data rate either using timing offsets or using frequency offsets or using a combination of both, as the communications parameter which is changed between layers to allow separability of the layers and recovery of the layered transmitted data in the receiver. OFDMA QLM with frequency offsets is implemented in FIG. 10A in a transmitter and in FIG. 13A in a receiver.

CDMA quadrature parallel-layered modulation QLM can increase the data rate either using timing offsets or using frequency offsets or using a combination of both, as the communications parameter which is changed between layers to allow separability of the layers and recovery of the layered transmitted data in the receiver. CDMA QLM with frequency offsets is implemented in FIG. 10B in a transmitter and in FIG. 13B in a receiver. Using a Hybrid Walsh or a generalized Hybrid Walsh CDMA orthogonal channelization code developed in patent application Ser. Nos. 09/826,117 and 09/846, 410 localizes the frequency spread of the decoded CDMA signal so that it is feasible to use a trellis algorithm for decoding. With timing offsets the CDMA block codes have to be reshuffled so that the encoded data symbols $Z(n(k))=\Sigma_u Z(u)$ C(u,n(k)) over blocks k=0, 1, 2, ... are grouped together for each n to ensure that the timing offsets are not introducing unwanted cross-correlations between CDMA channels.

OWDMA quadrature parallel-layered modulation QLM can increase the data rate either using timing offsets or using frequency offsets or using a combination of both, as the communications parameter which is changed between layers to allow separability of the layers and recovery of the layered transmitted data in the receiver. OWDMA QLM with timing offsets is implemented in FIG. 10C in a transmitter and in FIG. 13C in a receiver. OWDMA was developed in patent application Ser. No. 09/826,118. OWDMA generates a uniform bank of orthogonal Wavelet filters with the same spacing and symbol rate as OFDMA and with the advantage that the individual channels remain orthogonal with timing offsets and are less sensitive to frequency offsets.

Other communications applications include TDMA QLM and FDMA QLM. FH QLM is a layered QLM modulation with multiple access being provided by the FH on the individual hops. PPM QLM can be layered with QLM similar to QAM when the symbol modulation is replaced by pulse-position-modulation PPM.

Step 1 in the derivation of the capacity bound is summarized in equations (4) and observes that the trellis algorithms for convolutional, maximum a-posteriori MAP, and Turbo decoding are implemented to invert correlated sequences and derive the transmitted data. This means a suitably constructed trellis algorithm will successfully invert the transmitted layers 1, ..., $n_p$ of communications channels for QLM to recover estimates of the transmitted symbols. In turn this means a trellis algorithm allows a communications bandwidth B to support $n_p \geq 1$ QLM layers of parallel communications channels that are time synchronized for transmission at $T_s/n_p$, $2T_s/n_p$, ..., $(n_p-1)T_s/n_p$ offsets respectively for layers 2, 3, ..., $(n_p-1)$ relative to the $1^{st}$ layer at zero offset. Continuing this example with time as the differentiating parameter, this means QLM transmits symbols at $\Delta T_s$ intervals with $\Delta T_s = T_s/n_p$. Maximum capacity for each layer is equal to the Shannon bound in 1 in equations (4) which is the Shannon bound in 2 in equations (2) with b, S/N replaced by $b_p$, $(S/N)_p$ for each layer with the subscript "p" referring to each communications layer. Maximum capacity b in 2 in equations (4) for the $n_p$ layers is the product of $n_p$ and $b_p$.

Step 1

$$1\ \max\{b_p\}=\log_2[1+(S/N)_p]$$

$$2\ b=n_p \log_2[1+(S/N)_p] \quad (4)$$

where $b=n_p b_p$ is the number of bits over a $T_s$ interval, $(S/N)_p=S/N$ per symbol in each of the parallel-layered communications sets of channels, and the maximum label for b has been removed since there is a dependency on both $n_p$ and $(S/N)_p$ which must be defined in order to transform this equation into a maximum for b.

Step 2 in the derivation of the capacity bound is summarized in equations (5) and observes that the correlated parallel communications layers will equally share in the transmitted S/N when there is equal signal power in each layer and also observes that the signal power available for demodulation in each layer is equal to the signal power in each layer over the separation interval $\Delta T_s$ since time is the differentiating parameter between layers for this example. This means that for demodulation, each layer receives the signal power over the fraction $\Delta T_s=T_s/n_p$ of the symbol interval $T_s$ and $n_p(S/N)_p=n_p[S\Delta T_s/N_o]_s=[ST_s/N_o]_s=(S/N)_s$ is equal to the signal to noise ratio $(S/N)_s$ over $T_s$ for each layer summarized in 1 in equations (5). The total S/N over $T_s$ is the sum of the $(S/N)_s$ for each layer which yields 2 in equations (5).

Step 2

$$1\ n_p(S/N)_p=(S/N)_s$$

$$2\ S/N=(n_p\hat{\ }2)(S/N)_p \quad (5)$$

Results of steps 1 and 2 are used to derive the $E_b/N_o$ from the value $(E_b/N_o)_p$ in each layer. Substituting the identities $S/N=bE_b/N_o$, $(S/N)_p=b_p(E_b/N_o)_p$, and $b=n_pb_p$ into equation 2 in equations (5) yields equation (6).

$$E_b/N_o=n_p(E_b/N_o)_p \quad (6)$$

Equations (4) and (5) for step 1 and step 2 respectively can be combined with the identity $S/N=bE_b/N_o$ to yield the equations (7) for the new bounds on C, max{b}, and max{η} as a function of S/N, $E_b/N_o$ and for the minimum $E_b/N_o$ written as min{$E_b/N_o$} as a function of b wherein the optimization is over the number of communications layers $n_p$.

Upper bounds for b and η defined in 2 in equations (7) are derived from 2 in equations (4), 2 in equations (5), and the identities $S/N=bE_b/N_o$ and max{η}=max{b} in the form of a maximum with respect to the selection of the parameter $n_p$ for fixed values of S/N in the first expression and in the second for fixed values of $E_b/N_o$ with an interactive evaluation of b from the first expression.

Upper bound for C in 1 in equations (7) is derived from the capacity equation for max{b} in 2 in equations (7) and the identities b=C/B and $S/N=bE_b/N_o$ in the form of an upper bound on C with respect to the selection of the parameter $n_p$ for fixed values of S/N in the first expression and in the second for fixed values of $E_b/N_o$ with an interactive evaluation of b from 2.

Lower bound on $E_b/N_o$ which is the minimum value min{$E_b/N_o$} in 3 in equations (7) is derived by solving the second expression in 2 and taking the minimum over all allowable values of $n_p$.

The new coding theorem in 4 states that C is the upper bound on the information data rate $R_b$ in bits/second for which error correcting codes exist to provide reliable communications with an arbitrarily low bit error rate BER where C is defined in 1 in equations (7) and upgrades the Shannon coding theorem 3 in equations (2) using new capacity bound C in 1 in equations (7).

New capacity bounds and coding theorem

1. $C=\max\{n_pB \log_2[1+(S/N)/n_p^2]\}$ $=\max\{n_pB \log_2[1+(bE_b/N_o)/n_p^2]\}$ 2. $\max\{b\}=\max\{n_p \log_2[1+(S/N)/n_p^2]\}$ $=\max\{n_p \log_2[1+(bE_b/N_o)/n_p^2]\}$ $=\max\{\eta\}$ 3. $\min\{E_b/N_o\}=\min\{[n_p^2/b]/[2^b]/n_p-1]\}$ 4. New coding theorem For $R_b<C$ there exists codes which support reliable communications For $R_b>C$ there are no codes which support reliable communications (7)

FIG. 7, 8 calculate these new capacity bounds defined in equations (7) and compare them with the existing Shannon bounds. In FIG. 7 the new bound 29 from equations (7) and the Shannon bound 30 from equations (2) are calculated as b versus $E_b/N_o$. The units for b in FIGS. 7,8 are bits/(symbol interval) consistant with the Shannon bound where "symbol interval" refers to the $T_s$ interval In FIG. 8 the new bound 31 from equations (7) and the Shannon bound 32 from equations (2) are calculated as b versus S/N. The maximum and minimum with respect to $n_p$ for the new bounds assumed integer values for the number of layers $n_p$. This assumption corresponds to the expected applications and it is not a restriction since one can implement the architecture for a QLM with a non-integer number of layers $n_p$. If we had assumed continuous values for the number of layers $n_p$ the bounds increase slightly above the Shannon bound for lower values <4 dB for $E_b/N_o$ and for lower values <8 dB for S/N. As calculated in these figures for integer values of $n_p$ the bounds collapse to the Shannon bound for these lower values of $E_b/N_o$ and S/N.

FIG. 9 defines the QLM modulation for an ideal pulse modulation with timing offsets as the differentiating parameter between the QLM layers. The reference pulse 33 $P_i=P_i(t)$ defined over time 34 t is 35 $T_s$ seconds long and normalized with amplitude 36 $1/T_s$. Starting time 37 is $t=i_1T_s+\Delta i\Delta T_s$ and the ending time 38 is $T_s$ seconds later. Indexing convention is the pulse i has a $\Delta i\Delta T_s$ offset relative to the reference time $i_1$, pulse i+1 41 has a $(\Delta i+1)\Delta T_s$ offset 37, pulse i−1 43 has a $(\Delta i-1)\Delta T_s$ offset 37, and this convention applies to all i. Symbol modulation 39 Aexp(jφi) when multiplied by the pulse amplitude 36 $1/\sqrt{T_s}$ is the complex envelope of the pulse waveform. Consecutive pulses are spaced at 40 $\Delta T_s=T_s/n_p$ second intervals. Also shown are the consecutive later pulse 41 and the continuation 42, and the earlier pulses 43 and 44 and the continuation 45. Starting times for these additional pulses are given in 37. This QLM architecture has a pulse overlap of nearest neighbor pulses with a corresponding correlation between these pulses.

FIG. 10A is the transmitter block diagram FIG. 5 modified to support OFDMA QLM with frequency offsets to increase the symbol transmission rate from $1/T_s$ to the QLM rate $n_p/T_s$ and with an increase in transmitter power to support this increased data rate. Ideal OFDMA uses an N-point inverse fast fourier transform $FFT^{-1}$ on the input data symbols at the sample rate $1/T_s$ over the time interval $NT_s$. Symbol output rates are $1/NT_s$ and the N channels have a total symbol rate equal to $N/NT_s=1/T_s$=Nyquist sample rate. QLM transmits in parallel the $n_p$ $FFT^{-1}$ which are offset in frequency by 0, Δk, 2Δk, ..., $(n_p-1)$Δk using the normalized frequency index k and are implemented in 49 by the frequency translation operator with $FFT^{-1}$ time sample index n. Following this frequency translation the $FFT^{-1}$ is performed 50 and the output streams of the OFDMA encoded symbols for the $n_p$ frequency offsets are summed 51 and waveform encoded and the up-sampled output stream of complex baseband signal samples 52 {z($t_i$)} at the digital sample times $t_i$ with digitization index i, is handed over to the DAC and SSB upconverter 52. Input processing for QLM modulation in 46,47,48 is identical to corresponding input processing in FIG. 5 in 13,14,15 and the output processing is also described in FIG. 5. Non-ideal OFDMA has a separation interval between contiguous $FFT^{-1}$ data blocks to allow for timing offsets and the rise and fall times of the channelization filter prior to the $FFT^{-1}$ processing.

FIG. 10B is the transmitter block diagram FIG. 5 modified to support CDMA QLM with frequency offsets to increase the symbol transmission rate from $1/T_s$ to the QLM rate $n_p/T_s$ and to increase the transmitter power level to support this increased data rate. Similar to OFDMA the frequency translation is performed 104 and the output streams of the CDMA encoded 105 symbols for the $n_p$ frequency offsets are summed 106 and waveform encoded and the up-sampled output stream of complex baseband signal samples 107 {z($t_i$)} at the digital sample times $t_i$ with digitization index i, is handed over to the DAC and SSB upconverter 107. Input processing for QLM modulation in 101,102,103 is identical to the corresponding input processing in FIG. 5 in 13,14,15 and the output processing is also described in FIG. 5.

FIG. 10C is the transmitter block diagram FIG. 5 modified to support OWDMA QLM with time offsets to increase the symbol transmission rate from $1/T_s$ to the QLM rate $n_p/T_s$ and to increase the transmitter power level to support this increased data rate. The $n_p$ time delays 0, $\Delta T_s$, $2\Delta T_s$, $3\Delta T_s$, ..., $(n_p-1)\Delta T_s$ are performed 114 and the output streams of the OWDMA encoded 115 symbols for the $n_p$ time delays are summed 116 and waveform encoded and the up-sampled output stream of complex baseband signal samples 117 $\{z(t_i)\}$ at the digital sample times $t_i$ with digitization index i, is handed over to the DAC and SSB upconverter 117. Input processing for QLM modulation in 111,112,113 is identical to the corresponding input processing in FIG. 5 in 13,14,15 and the output processing is also described in FIG. 5.

For GMSK QLM with the pulse waveform in FIG. 9 replaced by a Gaussian pulse, the transmitter block diagram in FIG. 3 is modified by the QLM symbol rate increase. The GMSK QLM receiver block diagram in FIG. 4 is modified by a trellis demodulation overlay of the Viterbi decoding for each QLM layer.

Demodulation for QLM in FIG. 9 implements signal detection to remove the waveform and recover estimates of the transmitted complex baseband signal followed by signal decoding to recover estimates of the transmitted data. The pulse waveform is removed by a convolution of the received signal $\hat{z}(t)$ with the complex conjugate of the transmitted pulse waveform and this convolution generates the Rx estimate $Y_i$ of the transmitted Tx symbol $X_i = \Sigma_{\delta i} Z_{i+\delta i} c(\delta i)$ equal to the correlated sum of the data symbols $Z_{i+\delta i} = A_{i+\delta i} \exp(j \phi_{i+\delta i})$ with each data symbol encoded with the signal amplitude $A_i$ and signal phase $\phi_i$ for PSK and QAM symbol encoding and where $c(\delta i)$ is the correlation coefficient of the pulse waveform $p_i(t) = P_i(t)$ in FIG. 10, over neighboring symbols at $i+\delta i = i+/-1$, $i+/-2$, ... where $\delta i = \Delta i$ in FIG. 10 and by definition $c(\delta i) = \int p_i(t) p_{i+\delta i}(t) dt$ which is normalized so that $c(0)=1$. Also, one can partition this integration into integrations over the pulse separations $\Delta T_s$ whereupon the symbol estimates $\hat{Z}_i$ have different values for the correlation coefficients $c(\delta i)$. The signal detection correlation matrix R is constructed from the set of correlation coefficients $\{c(\delta i)\}$ by the equation of definition $R=[R(i,k)]=[c(k-i)]$ and is an n×n matrix for full symbol $T_s$ integration and an $(n+n_p-1) \times (n+n_p-1)$ matrix for partial symbol $\Delta T_s$ integration where n is the number of data symbols and the notation "n×n" reads "n by n".

Equations (11) construct block length n pulse examples of the correlation matrix R for FIG. 9 for full symbol integration over the $T_s$ pulse length specified by the parameter set $T_s$, n, $n_p$ and for integration over the pulse separation $\Delta T_s$ specified by the parameter set $\Delta T_s$, n, $n_p$.

Signal detection correlation matrix

1. Correlation matrix R definition $R(i,k)=R$(row, column)

$=R$(output, input)

$=[c(\delta i)]$ matrix with elements $c(\delta i)$ $=n \times n$ matrix for full symbol $T_s$ integration $=(n+n_p-1) \times (n+n_p-1)$ matrix for $\Delta T_s$ integration 2. R for $T_s$, n=5, $n_p$=2

$$R = \begin{bmatrix} 1 & 0.5 & 0 & 0 & 0 \\ 0.5 & 1 & 0.5 & 0 & 0 \\ 0 & 0.5 & 1 & 0.5 & 0 \\ 0 & 0 & 0.5 & 1 & 0.5 \\ 0 & 0 & 0 & 0.5 & 1 \end{bmatrix}$$

3. R for $\Delta T_s$, n=5, $n_p$=2

$$R = \begin{bmatrix} 0.5 & 0 & 0 & 0 & 0 & 0 \\ 0.5 & 0.5 & 0 & 0 & 0 & 0 \\ 0 & 0.5 & 0.5 & 0 & 0 & 0 \\ 0 & 0 & 0.5 & 0.5 & 0 & 0 \\ 0 & 0 & 0 & 0.5 & 0.5 & 0 \\ 0 & 0 & 0 & 0 & 0.5 & 0.5 \end{bmatrix}$$

4. R for $T_s$, n, $n_p$ $$R = \begin{bmatrix} 1 & c(1) & c(2) & \cdots \\ c(1) & 1 & c(1) & \cdots \\ c(2) & c(1) & 1 & \cdots \\ \vdots & \vdots & \vdots & \ddots \end{bmatrix}$$

5. R for $\Delta T_s$, n, $n_p$ \hfill (11)

$$R = \begin{bmatrix} 1/n_p & 0 & 0 & \cdots \\ 1/n_p & 1/n_p & 0 & \cdots \\ 1/n_p & 1/n_p & 1/n_p & \cdots \\ \vdots & \vdots & \vdots & \ddots \end{bmatrix}$$

A block maximum-likelihood ML solution for the received QLM waveform in FIG. 9 for block transmission of n pulses with full symbol integration is given in equations (12). In 1 the data symbols for the array of n transmitted Tx pulses is the n×1 column vector Z with components $\{Z_i\}$ and where $[(o)]'$ is the transpose of $[(o)]$. In 2 components of the n×1 detected signal vector $Y=[Y_1, Y_2, \ldots, Y_n]'$ are equal to $Y_i=X_i+n_i$ where $n_i$ is the transmission path and receiver noise and $X_i$ is equal to the weighted sum of the correlated data symbols as defined in the previous. In 3 the matrix equation for Y is defined where R is the correlation matrix for both signal and noise and U is the n×1 Rx noise vector. The expected value definition $E\{UU'\}=2\sigma^2 R$ enables the ML solution of 3 to be derived $\hat{Z}=[R'(2\sigma^2 R)^{-1}R]^{-1}R(2\sigma^2 R)^{-1}Y$ and simplified to the equivalent equation in 4 where $\hat{Z}$ is the estimate of Z and $\sigma$ is the one-sigma value of the Rx additive white Gaussian noise AWGN for each Rx detected data symbol.

ML symbol detection for QLM

1. $Z = [Z_1, Z_2, \ldots, Z_n]'$ $= [A_1 \exp(j\phi_1), A_2 \exp(j\phi_2), \ldots, A_n \exp(j\phi_n)]'$ 2. $Y_i = X_i + n_i$ for all $i$ where $X_i = \Sigma_{\delta i} Z_{i+\delta i} c(\delta i)$

3. $Y = RZ + U$

4. $\hat{Z} = R^{-1} Y$  (12)

A similar matrix inversion algorithm can be derived for the recovery of estimates $\hat{Z}$ of the transmitted symbol set using the set of signal detection measurements over $\Delta T_s$.

A representative trellis algorithm to implement signal estimation to recover estimates of the transmitted symbols from the signal detection over the pulse length $T_s$ is defined in FIG. 12A,12B and simulated in FIG. 11 to validate the algorithm. This trellis algorithm is similar to a forward recursion maximum likelihood ML algorithm in convolutional decoding and is defined for the QLM in FIG. 9 using 4-PSK or 8-PSK over the $T_s$ detection interval where 4-PSK, 8-PSK have n=4, 8 phase states. The trellis algorithm is initialized 150 prior to the start k=0 with an empty shift register SR which normally contains the $2n_p-1$ Rx correlated data symbols for each of the possible trellis paths. At k=0 the path metric $\alpha_0(xi)$ is set equal to a negative or zero initialization constant for all of the nodes xi=0, 1, 2, ..., $(n_\phi\hat{\,}(2n_p-2)-1)$ of the trellis diagram where $\alpha_0(xi)$ is the logarithm of the state $S_0$ path metric at k=0 for node xi, $n_\phi$ is the number of phase states of the PSK modulation, the Rx symbols are indexed over k with k=0 indicating the initial value prior to the Rx symbol k=1, nodes of the trellis diagram are the states of the SR, and state $S_k$ refers to the trellis diagram paths and metrics at symbol k in the trellis algorithm. In the previous for ML block decoding the symbols were indexed over i.

Loop 151 processes the Rx symbols k=1, 2, ..., n where the index k also refers to the corresponding algorithm steps and the states of the trellis algorithm. In 152 the Rx signals are pulse detected to remove the carrier frequency and waveform to recover the normalized correlated symbol $Y_k$. For each Rx symbol $Y_k$ the state transition metrics $R_k(jxi)$ are calculated by the transition metric equations $\{R_k(jxi) = -|Y_k - \hat{X}_k(jxi)|^2\}$ for all possible transition paths $\{jxi\}$ from the previous state $S_{k-1}(xi)$ at node xi to the new state $S_k(jx)$ at node jx in the trellis diagram and where $\hat{X}_k(jxi)$ is the hypothesized normalized detected correlated symbol k for the path jxi and is defined by the equation $\hat{X}_k(jxi) = c(n_p-1) [sr(1)+sr(2n_p-1)] + \ldots + c(1)[sr(n_p-1)+sr(n_p+1)] + c(0)[sr(n_p)]$ which calculates $\hat{X}_k(jxi)$ as the correlated weighted sum of the elements of the shift register SR=[sr(1), sr(2), ..., sr($2n_p-1$)]' with $\hat{Z}_k = sr(2n_p)$, $\hat{Z}_{k-1} = sr(2n_p-1)$, $\hat{Z}_{k+1} = sr(2n_p+1)$, ... where $2n_p = 2n_p$, $c(0) = 1$, the normalized data symbol estimates $\{\hat{Z}_k\}$ correspond to the transition index jxi, and the state k estimated symbol $\hat{Z}_k$ is the SR center element $sr(n_p)$ with correlation coefficient $c(0)=1$. Symbols move from left to right starting with "j" with each new received symbol or step in the trellis recursion algorithm, and ending with "i". With this convention "j" is indexed over the states of sr(1), "x" is indexed over the current states of sr(2), ..., sr($2n_p-2$), and "i" is indexed over the states of sr($2n_p-1$). Index over the paths of the trellis diagram is defined by the equation jxi=sr(1)+$n_\phi$sr(2)+$n_\phi\hat{\,}2$ sr(3)+ ... +$n_\phi\hat{\,}(2n_p-2)$ sr($2n_p-1$)-1=0, 1, 2, ..., $n_\phi\hat{\,}(2n_p-1)-1$ when the contents of the SR elements are the indices corresponding to the assumed PSK values.

Loop 153 calculates the best trellis transition paths from state $S_{k-1}$ to the new state $S_k$ for the new nodes jx=0, 1, 2, ..., $n_\phi\hat{\,}(2n_p-2)-1$. In 154 the path metric $\alpha_k(S_k)$ is defined by the recursive logarithm equation $\alpha_k(S_k) = \alpha_{k-1}(S_{k-1}) + R(S_{k-1} \rightarrow S_k)$ which can be rewritten as $\alpha_k(jx) = \alpha_{k-1}(xi) + R(jxi)$ since the state $S_k$ corresponds to node jx, state $S_{k-1}$ corresponds to node xi and the state transition from $S_{k-1}$ to $S_k$ represented symbolically as $S_{k-1} \rightarrow S_k$ corresponds to the path jxi.

The best path metric $\alpha_k(jx)$ for each new node jx is chosen by the decisioning equation $\alpha_k(jx) = \text{maximum}\{\alpha_{k-1}(xi) + R_k(jxi)\}$ with respect to the admissible xi. For each jx, the corresponding xi yielding the highest value of the path metric $\alpha_k(jx)$ is used to define the new symbol $\hat{Z}_k$ and path.

For k≧D the state metric $S_k$ is upgraded for this new path jxi by the update operation $S_k(:,jx) = [\hat{Z}_k(jxi); S_{k-1}(1:D-1, xi)]$ using Matlab notation which replaces the column jx vector with the column xi vector after the elements of xi have been moved down by one symbol and the new symbol $\hat{Z}_k$ added to the top of the column vector which is the row 1 element. State $S_k$ is a D by $n_\phi\hat{\,}(2n_p-2)$ matrix with the column vectors equal to the trellis states over the past D symbols where "D" is the trellis decoding memory extending over several correlation lengths $(2n_p-1)$ for the solution to be stabilized. In Matlab notation the $S_k(:,jx)$ is the column vector jx of $S_k$ consisting of the new symbol $\hat{Z}_k$ and the previous D-1 symbols along the trellis path to node jx and the $S_{k-1}(1:D,xi)$ is the D×1 column vector of $S_{k-1}$ for the previous node xi.

For k≦D the state metric $S_k$ is upgraded for this new path jxi by the operation $S_k(:;jx) = [\hat{Z}_k(jxi); S_{k-1}(:;xi)]$ which replaces the column jx vector with the column xi vector after the new symbol $\hat{Z}_k$ has been added to the top of the column which is the row 1 element to increase the path size by one. State $S_k$ is a k by $(n_\phi\hat{\,}(2n_p-2))$ matrix with the column vectors equal to the trellis states over the past k symbols.

Metric values for each path in $S_k$ are stored for later use in soft decisioning turbo and convolutional decoding. Metrics of interest for each symbol k and for each jx are the values of $\{\alpha_{k-1}(xi) + R(jxi)\}$ for all admissible xi states for the new path symbol $\hat{Z}_k$ for jx for k.

For symbols k≧D the estimated values $\hat{Z}_{k-D}$ of the Tx symbols are delayed by the path length D and read from the last row element of the column jx path vector of the state metric $S_k$ for symbol k, and the readout continues until k=n. This ends the jx loop 153 and the k loop 151.

Processing 162 continues with steps k=n+1, ..., n+D-1 160,161 to recover the estimated values $\hat{Z}_{k-D}$ of the Tx symbols $Z_k$ which are read from the corresponding row elements D-1, D-2, ..., 1 of the column jx path vector of the state metric $S_n$ for the last symbol k=n. This ends the jx loop 161.

Outputs 164 of the trellis algorithm are the estimates $\{\hat{Z}_k\}$ of the transmitted symbols $\{Z_k\}$ and the corresponding metric values for all admissible states for each new path symbol $\hat{Z}_k$ for all k. These symbol estimates and metric measurements are the soft decisioning data estimates handed over 165 to recover the Tx data or handed over for error correction decoding 166 with turbo or convolutional decoding. Another option is to combine the error correction decoding with the symbol recovery.

The trellis algorithm for QLM example FIG. 9 using partial symbol $\Delta T_s$ integration presents another approach to a trellis algorithm for symbol recovery which offers a potential reduction in computational complexity compared to the algorithm for full symbol $T_s$ integration in the trellis algorithm in FIG. 12B,12C. The largest computational burden is the calculation of the metrics, paths, and states. For the trellis algorithm in FIG. 12B,12C. the number of calculations is determined by the number $n_\phi\char`\^(2n_p-2)$ of nodes in the trellis algorithm. For the $\Delta T_s$ integration the trellis algorithm the number of nodes reduces to a significantly lower number $n_\phi\char`\^(n_p-1)$. For this invention disclosure it is sufficient to demonstrate the trellis algorithm defined in FIG. 12A,12C.

FIG. 11 measures the trellis decoding performance for uncoded 4-PSK for $n_p=1$ and $n_p=2$ layers of QLM modulation implementing the decoding algorithm FIG. 12A, 12B. Performance is plotted as bit error rate BER versus the normalized value $(E_b/N_o)/n_p$ of the $E_b/N_o$ for the new bound. The ideal BER for $n_p=1$ is plotted as a function of $(E_b/N_o)/n_p$ which is the normalized value of $E_b/N_o$ equal to $(E_b/N_o)_p$ for each of the communications layers from the derivation in equations (4), (5), (6). Normalization means that for a given BER the $(E_b/N_o)/n_p$ has the same value for all $n_p$. For example, this means that BER=0.001 requires $(E_b/N_o)/n_p$=6.8 dB and for $n_p$=1, 2, 4 this requires $E_b/N_o$=6.8+0=6.8, 6.8+3=9.8, 6.8+6=12.8 dB respectively. Measured performance values for $n_p=2$ from a direct error count Monte Carlo simulation of the trellis algorithm are plotted in FIG. 11 as discrete measurement points.

FIG. 13A is the receiver block diagram FIG. 6 modified to support OFDMA QLM from the OFDMA QLM transmitter in FIG. 10A. Receive processing for QLM modulation in 54,55,56,57 is identical to the corresponding receive processing in 21,22,23,24 in FIG. 6 and the output processing 60,61 following OFDMA QLM demodulation is also described in 26,28 in FIG. 6. ADC output signal is demultiplexed into $n_p$ parallel signals 58 which are offset in frequency by 0, $\Delta k$, $2\Delta k$, ..., $(n_{p-1})\Delta k$ and processed by the FFT's. Outputs are trellis decoded 59 with an algorithm comparable to the algorithm defined in FIG. 12A,12B for PSK QLM. Outputs are further processed 60,61 to recover estimates of the transmitted data.

FIG. 13B is the receiver block diagram FIG. 6 modified to support CDMA QLM from the CDMA QLM transmitter in FIG. 10B. Receive processing for QLM modulation in 121, 122,123,124 is identical to the corresponding receive processing in 21,22,23,24 in FIG. 6 and the output processing 127,128 following CDMA QLM demodulation is also described in 26,28 in FIG. 6. ADC output signal is demultiplexed into $n_p$ parallel signals 125 which are offset in frequency by 0, $\Delta k$, $2\Delta k$, ..., $(n_p-1)\Delta k$ and processed by the CDMA decoders. Outputs are trellis decoded 126 with an algorithm comparable to the algorithm defined in FIG. 12A, 12B for PSK QLM. Outputs are further processed 127,128 to recover estimates of the transmitted data.

FIG. 13C is the receiver block diagram FIG. 6 modified to support OWDMA QLM from the OWDMA transmitter in FIG. 10C. Receive processing for QLM modulation in 131, 132,133,134 is identical to the corresponding receive processing in 21,22,23,24 in FIG. 6 and the output processing 137,138 following OWDMA QLM demodulation is also described in 26,28 in FIG. 6. ADC output signal is demultiplexed into $n_p$ parallel signals 135 which are offset in frequency by 0, $\Delta k$, $2\Delta k$, ..., $(n_p-1)\Delta k$ and processed by the FFT's. Outputs are trellis decoded 136 with an algorithm comparable to the algorithm defined in FIG. 12A,12B for PSK QLM. Outputs are further processed 137,138 to recover estimates of the transmitted data.

Consider the QLM modulation and demodulation algorithms and implementation for GMSK. QLM increases the data rate by transmitting $n_p \geq 1$ layers of data encoded Gaussian frequency pulses that are time synchronized for transmission at $T_s/n_p$, $2T_s/n_p$, ..., $(n_p-1)T_s/n_p$ offsets respectively for layers 2, 3, ..., $(n_p-1)$ relative to the ground or $1^{st}$ layer of GMSK. In FIG. 3 this means the bit-rate increases from $1/T_s$ to $n_p/T_s$ and the bit or symbol time remains the same at $T_s$. In FIG. 4 the trellis algorithm in FIG. 12A, 12B is an overlay on the Viterbi algorithm or is combined with the Viterbi algorithm, with suitable modifications to model the architecture of the GMSK demodulator.

FIGS. 14,15 calculate the coded QLM performance 64,69 using equations (19) for QLM PSK. In 1 examples of QLM PSK for 4,8-PSK are given for b=3, 4, 6, 8, 12, 16 bits per symbol interval as functions of $b_s$=2, 4 uncoded bits per data symbol for 4,8-PSK, QLM layers $n_p$=2, 4, 8, and coding rate R=(information bits/data bits)=⅔, ¾. It is well known that the most bandwidth efficient coding for 4,8-PSK use R=¾, ⅔ in 1. In 2 the corresponding values of $E_b/N_o$=3.0, 4.1 dB for 4,8-PSK at BER=1e-6 are from the turbo coding data in FIG. 1, 2. In 3 the $E_b/N_o$ for $n_p$ layers is calculated from the measured values for the $1^{st}$ or ground layer in 2 using equations (6). In 4 the S/N is calculated as a function of the $E_b/N_o$ in 3, 4 and the b in 1. FIGS. 14,15 also calculate the b versus $E_b/N_o$, S/N performance for the new bounds 62,67, Shannon bounds 63,68, and summarize the turbo coded PSK 65,70, and turbo coded QAM 66,71. The new bounds and Shannon bounds are from FIGS. 7,8 and the PSK and QAM from FIGS. 1,2.

It should be clear that the combinations of parameters $b_s$, $n_p$, R in 1 in equations (19) are a limited subset of possible values some of which may provide improved overall performance. The selected subset is intended to illustrate the principles, algorithms, implementation, and performance, and is not necessarily the preferred subset for overall performance.

QLM PSK performance

1 Information bits b per symbol

| PSK | $b_s \times n_p \times R = b$ |
|---|---|
| 4-PSK | 2 × 2 × 3/4 = 3 |
| 8-PSK | 3 × 2 × 2/3 = 4 |
| 4-PSK | 2 × 4 × 3/4 = 6 |
| 8-PSK | 3 × 4 × 2/3 = 8 |
| 4-PSK | 2 × 8 × 3/4 = 12 |
| 8-PSK | 3 × 8 × 2/3 = 16 |

2 PSK Turbo coding measurements

4-PSK $E_b/N_o$=3.0 dB for Turbo coding, rate R=¾, BER=1e-6

8-PSK $E_b/N_o$=4.1 dB for Turbo coding, rate R=⅔, BER=1e-6

3 $E_b/N_o$ estimates

4-PSK $E_b/N_o$=3.0+10 $\log_{10}(n_p)$dB

8-PSK $E_b/N_o$=4.1+10 $\log_{10}(n_p)$dB

4 S/N estimates $$S/N = E_b/N_o + 10 \log_{10}(b), \text{ dB} \qquad (19)$$

This patent covers the plurality of everything related to QLM generation and data recovery of QLM and to the corresponding bounds on QLM summarized in equations (7) and to all applications of QLM inclusive of theory, teaching, examples, practice, and of implementations for related technologies. The representative transition metric and trellis algorithm in FIG. 12A, 12B used for demodulation of QLM PSK in FIG. 11 is an example to illustrate the methodology and validate the performance equations in (7), (16) and is representative of all QLM algorithms including maximum likelihood ML, maximum a posteriori MAP, maximum a priori, finite field techniques, direct and iterative estimation techniques, and all other related algorithms whose principal function is to recover estimates of the transmitted symbols for QLM parallel layered modulation as well as data recovery related to QLM and the QLM bounds.

Preferred embodiments in the previous description of modulation and demodulation algorithms and implementations for QLM for the known modulations and demodulations and for all future modulations and demodulations, are provided to enable any person skilled in the art to make or use the present invention. The various modifications to these embodiments will be readily apparent to those skilled in the art and the generic principles defined herein may be applied to other embodiments without the use of the inventive faculty. Thus, the present invention is not intended to be limited to the embodiments shown herein but is to be accorded the wider scope consistent with the principles and novel features disclosed herein. Additional applications for QLM signal processing and bound include the plurality of information theorectic applications with examples being radar, imaging, and media processing.

What is claimed is:

1. A method for implementation of Quadrature Parallel-Layered Modulation (QLM) for communications over the same frequency bandwidth of a carrier frequency, said method comprising the steps:

generating a first communications signal over the frequency bandwidth at the carrier frequency for the first channel by modulating a first stream of data symbols with a waveform at a $1/T_s$ symbol rate wherein "$T_s$" is the time interval between contiguous symbols, generating a second communications signal over the same frequency bandwidth at the same carrier frequency for a second channel by modulating a second stream of data symbols with the same waveform at the same symbol rate as the first stream of data symbols and with a time offset $\Delta T_s$ equal to $\Delta T_s = T_s/n_p$ wherein "$n_p$" is the number of QLM channels in said frequency bandwidth, for any additional channels, continuing generation of communication signals over the same frequency bandwidth at the same carrier frequency by modulating additional streams of data symbols with the same waveform at the same data symbol rate as the first and second streams of data symbols, with time offsets increasing in each communication signal in increments of $\Delta T_s = T_s/n_p$ until the $n_p$ signals are generated for $n_p$ QLM channels, transmitting and receiving said communications signals over a QLM communications link consisting of the $n_p$ QLM channels, recovering data symbols of the communications signals in a receiver using a demodulation algorithm, and combining said algorithm with error correction decoding to recover the transmitted information; whereby time offsets have been used as a differentiating parameter to enable QLM parallel channels of communications over the same frequency bandwidth at the same carrier frequency with a data symbol rate above the Nyquist rate, to be demodulated, wherein the communication signals have the following properties:

maximum capacity "C" in bits/second is defined by equation $$C = \max\{n_p B \log_2(1+(S/N)/n_p^2)\}$$

wherein the maximum "max" is with respect to $n_p$, "$\log_2$" is the logarithm to the base 2, "B" is the frequency bandwidth in Hz, and "S/N" is the ratio signal-to-noise over "B", maximum number of bits "b" per symbol interval $T_s = 1/B$ is defined by equation $$\max\{b\} = \max\{n_p(1+(S/N)/n_p^2)\},$$

maximum communications efficiency "$\eta$" in Bits/second/Hz is defined by equation $$\max(\eta) = \max\{b\},$$

minimum signal-to-noise ratio per bit "$E_b/N_o$" is defined by equation $$\min\{E_b/N_o\} = \min\{[n_p^2/b]/[2^b]/n_p - 1]\}$$

wherein "$E_b$" is the energy per bit, "$N_o$" is the power spectral density of the noise, and the minimum "min" is the minimum with respect to $n_p$, and wherein these performance bounds apply to communications receiver demodulation performance of a QLM communications link consisting of $n_p$ QLM channels.

2. The method of claim 1, wherein deriving the maximum capacity "C" comprises the steps of:

using Shannon's bound on maximum capacity "$C_p$" of each channel specified by equation $$C_p = B \log_2[1+(S/N)_p]$$

wherein "$(S/N)_p$" is the signal-to-noise ratio for each channel, using C equal to the sum of $C_p$ for each layer yields equation $$C = n_p B \log_2[1+(S/N)_p]$$

wherein "$(S/N)_p$" is a) $1/n_p$ of S/N for $n_p$ channels, b) $1/n_p$ of available S/N for each channel in (a) since this is the fraction of the symbol energy not shared with the other channels and available for demodulation, c) and combining (a) and (b) yields equation $$(S/N)_p = (S/N)/n_p^2,$$

combining equations for C and $(S/N)_p$ yields equation $$C = n_p B \log_2[1+(S/N)/n_p^2],$$

wherein the maximum capacity C is derived by taking the maximum with respect to $n_p$, and wherein these performance bounds apply to communications receiver demodulation performance of a QLM communications link consisting of $n_p$ QLM channels.

3. The method of claim 2, wherein QLM is implemented using frequency f offset $\Delta f$ or said time offset $\Delta T_s$ or a plurality of other said differentiating parameters or combinations thereof as said differentiating parameters for said communications signaling, using phase shift keying (PSK) or quadrature amplitude data symbol modulations or Bandwidth Efficient Modulation (BEM) or Gaussian minimum shift keying GMSK or a plurality of other data symbol modulations or a combination of data symbol modulations for said signaling, and implementing said demodulation of said signaling using a trellis algorithm or a maximum likelihood algorithm or a plurality of demodulation algorithms and using error correction decoding to improve said demodulation performance.

4. The method of claims 1, 2, or 3 wherein transmitting the communications signals comprises using QLM orthogonal frequency division multiple access (OFDMA), orthogonal Wavelet division multiple access (OWDMA), orthogonal code division multiple access (CDMA) transmission, or a plurality of other multiple access communications techniques, and applying said maximum capacity property to the transmissions.

* * * * *